(12) United States Patent
Kajiura et al.

(10) Patent No.: US 8,226,222 B2
(45) Date of Patent: Jul. 24, 2012

(54) INK SET, RECORDING METHOD, AND COLORED OBJECT

(75) Inventors: Noriko Kajiura, Tokyo (JP); Yoshiaki Kawaida, Tokyo (JP); Akira Kawaguchi, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 168 days.

(21) Appl. No.: 12/933,862

(22) PCT Filed: Mar. 25, 2009

(86) PCT No.: PCT/JP2009/055936
§ 371 (c)(1),
(2), (4) Date: Sep. 21, 2010

(87) PCT Pub. No.: WO2009/119656
PCT Pub. Date: Oct. 1, 2009

(65) Prior Publication Data
US 2011/0032302 A1    Feb. 10, 2011

(30) Foreign Application Priority Data

Mar. 28, 2008   (JP) .................................. 2008-088769

(51) Int. Cl.
*B41J 2/17*   (2006.01)
(52) U.S. Cl. ............................ 347/95; 347/20; 347/100
(58) Field of Classification Search .................. 347/5, 9, 347/10, 20, 56, 95, 100; 106/31.6, 31.13, 106/31.27; 523/160–161
See application file for complete search history.

(56) References Cited

U.S. PATENT DOCUMENTS 6,646,024 B2 * 11/2003 Beach et al. .................. 523/160
2008/0022467 A1   1/2008 Baettig et al.

FOREIGN PATENT DOCUMENTS

| JP | 2005-105135 | 4/2005 |
| JP | 2006-63329 | 3/2006 |
| JP | 2007-277416 | 10/2007 |
| WO | WO 2004/087815 | 10/2004 |
| WO | WO 2007/116933 | 10/2007 |
| WO | WO 2009/060654 | 5/2009 |

OTHER PUBLICATIONS

International Search Report issued in corresponding PCT Application No. PCT/JP2009/055936, mailed Jun. 23, 2009.

* cited by examiner

*Primary Examiner* — Juanita D Jackson
(74) *Attorney, Agent, or Firm* — Knobbe Martens Olson & Bear, LLP

(57) ABSTRACT

An ink set is provided which, when used in color ink-jet printing, can give a full-color printed image having a satisfactory hue and brightness and excellent in various fastness properties. More specifically, an ink set for ink-jet recording is provided that is an ink set of at least two colors which includes at least two ink compositions, i.e., a cyan ink composition and a magenta ink composition. The cyan ink composition contains a cyan dye which is a dye represented by the following formula (7) or a salt thereof. The magenta ink composition contains a magenta dye which is a dye represented by the following formula (6) or a salt thereof.

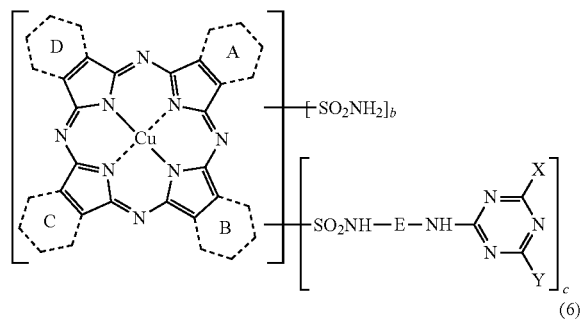

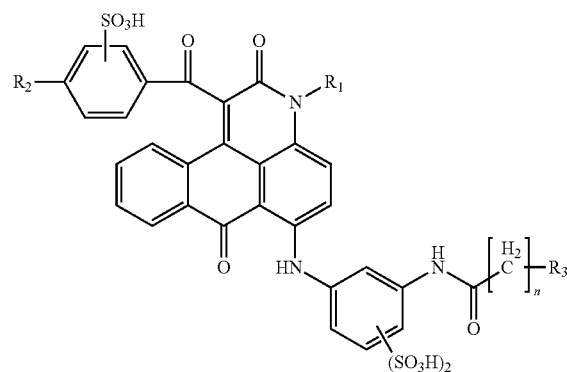

15 Claims, No Drawings

INK SET, RECORDING METHOD, AND COLORED OBJECT

This application is the U.S. National Phase under 35 U.S.C. §371 of International Application PCT/JP2009/055936, filed Mar. 25, 2009, designating the U.S., and published in Japanese as WO2009/119656 on Oct. 1, 2009, which claims priority to Japanese Patent Application No. 2008-088769, filed Mar. 28, 2008.

TECHNICAL FIELD

The present invention relates to an ink set for ink-jet recording of at least two colors composed of two kinds of ink compositions each containing at least a dye having a different hue, an ink jet recording method using the ink set, and a colored object colored by the ink set.

BACKGROUND ART

For a recording method by an ink jet printer, which is one typical method among a variety of color recording methods, a variety of ink discharge systems have been developed. Such systems execute recording by generating ink droplets, and attaching the same to any of a variety of record-receiving materials (e.g., paper, film, and fabric, etc.). According to this method, a recording head is not brought into direct contact with the record-receiving material; therefore, generation of noise can be avoided thus achieving silent recording. In addition, due to having the feature that reduced size, increased speed and coloring can be readily achieved, prevalence in recent years has been in rapid progress, and great advancement hereafter is expected.

Inks containing a water soluble dye dissolved in an aqueous medium have been frequently used as conventional inks for fountain pens, felt pens etc., and inks for ink jet recording. Furthermore, to these inks is generally added a water soluble organic solvent in order to prevent pen tips or ink discharge nozzles from clogging with the ink. For these inks, demanded are abilities to generate a recorded image with satisfactory density, probability of avoiding occurrence of clogging at the pen tips and nozzles, favorable drying characteristics on the record-receiving materials, suppression of bleeding, superior storage stability, and the like. Additionally, a variety of fastness such as water resistance, moisture resistance, light resistance and gas resistance has been required of the recorded image.

In the meantime, for recording image or character information on a color display of computers in full color by an ink jet printer, subtractive color mixing generally with three inks having different colors, yellow (Y), magenta (M) and cyan (C), or four different colors including these three colors plus black (K) has been employed, whereby the recorded image is presented in full color. In order to reproduce an additive color mixing image formed with red (R), green (G), blue (B) on a CRT (cathode ray tube) display and the like as strictly as possible using subtractive color mixing, it is desired that Y, M and C, among the coloring matters used in inks, have a hue approximate to the standard and are brilliant, respectively. In addition, long term storage stability, as well as high density of the recorded image, and superior fastness such as water resistance, moisture resistance, light resistance and gas resistance are also required for the inks.

Herein, gas resistance means resistance to a phenomenon of causing discoloration of a printed image via a reaction of an oxidizing gas present in the air and having an oxidizing action such as nitric oxide gas and ozone gas with a coloring matter (dye) of the recorded image on or in recording paper. Particularly, ozone gas is considered as a main causative substance that promotes the fading phenomenon of ink jet recorded images. Since this discoloration phenomenon is characteristic in ink jet images, improvement of the gas resistance, particularly ozone gas resistance, is a significant technical problem in the art.

In recent years, an ink receiving layer may be provided on the surface of an exclusive ink jet paper, which is one of recording papers, in order to obtain a photo image quality according to ink jet recording methods. Although a porous white inorganic substance is often used in this ink receiving layer for accelerating drying of the ink, and reducing bleeding in high quality images, discoloration due to ozone gas is markedly found on such recording papers, in particular.

In order to improve reliability in ink jet recording methods, and to achieve high fastness properties and brightness of the resulting printed image, a variety of ink sets have been proposed as combinations of fundamental three primary colors for use in subtractive color mixing. In particular, according to technical approaches for improvement of fastness properties and brightness of printed images, methods in which the dye is improved have been predominantly employed, and as in, for example, the invention disclosed in Patent Document 1 to Patent Document 3, various novel dyes for yellow, magenta and cyan, respectively, as fundamental three primary colors, or three-color ink sets and the like have been proposed.

Patent Document 1: US Patent Application, Publication No. 2008/0022467
Patent Document 2: PCT International Publication No. 2004/087815
Patent Document 3: Japanese Unexamined Patent Application, Publication No. 2005-105135

DISCLOSURE OF THE INVENTION

Problems to be Solved by the Invention

When fastness properties on full-color images are considered, it is important to adjust color degradation balance of each three colors, as well as various fastness properties to be provided. In these respects, the ink sets which have been used conventionally do not yet satisfy marketing needs enough. An object of the present invention is to provide an ink set enabling full-color printed images that have satisfactory hue and brightness in color ink-jet recording, and are superior in fastness properties such as water resistance, moisture resistance, gas resistance and light resistance to be obtained.

Means for Solving the Problems

In order to solve the foregoing problems, the present inventors thoroughly investigated, and consequently found that the problems described above can be solved by using an ink set composed of at least two kinds of ink compositions containing a dye represented by a certain formula in ink-jet recording. Thus, the present invention was completed.

Accordingly, a first aspect of the present invention provides an ink set for ink-jet recording which is an at least two-color ink set composed of at least a cyan ink composition and a magenta ink composition, in which a cyan dye contained in the cyan ink composition is a dye represented by the following formula (7) or a salt thereof, and a magenta dye contained in the magenta ink composition is a dye represented by the following formula (6) or a salt thereof,

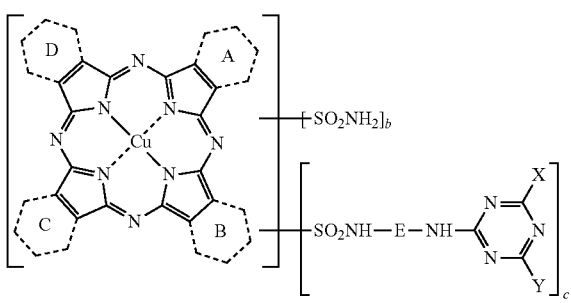

(7)

in the formula (7):

rings A to D each independently represent a benzene ring or a six-membered nitrogen-containing heteroaromatic ring; and at least one represents a nitrogen-containing heteroaromatic ring, and at least one of the rest represents a benzene ring;

E represents an alkylene group;

X represents an anilino group or a naphthylamino group having at least one sulfo group, carboxy group, or phosphoric acid group as a substituent, and the anilino group or naphthylamino group may be further substituted with one, or at least two substituents selected from the group consisting of a sulfo group, a carboxy group, a phosphoric acid group, a sulfamoyl group, a carbamoyl group, a hydroxy group, an alkoxy group, an amino group, a mono- or dialkylamino group, a mono- or diarylamino group, an acetylamino group, an ureide group, an alkyl group, a nitro group, a cyano group, a halogen atom, an alkylsulfonyl group and an alkylthio group;

Y represents an amino group; a hydroxy group; or a mono- or dialkylamino group or nitrogen-containing heterocycle group which may have one, or at least two substituents selected from the group consisting of a sulfo group, a carboxy group, a phosphoric acid group, a sulfamoyl group, a carbamoyl group, a hydroxy group, an alkoxy group, a hydroxyalkoxy group, an amino group, a mono- or dialkylamino group, a mono- or diarylamino group, an acetylamino group, an ureide group, an alkyl group, a nitro group, a cyano group, a halogen atom, an alkylsulfonyl group and an alkylthio group; with the proviso that combinations in which Y represents an amino group or a hydroxy group, and X represents a substituted anilino group are excluded;

b is a number of from 0 to 2.9; c is a number of from 0.1 to 3; and the sum of b and c is 1 to 3.

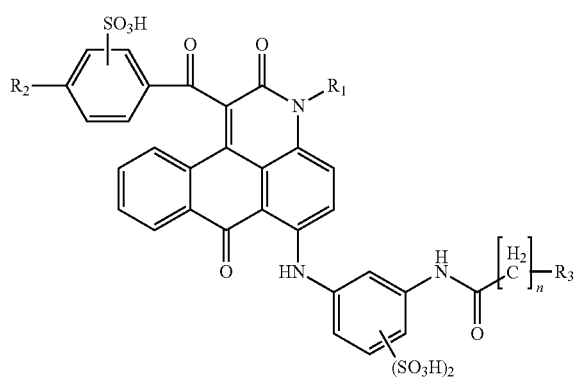

(6)

in the formula (6):

n represents an integer of 1 to 3;

$R_1$ represents a hydrogen atom, an alkyl group, a hydroxy lower alkyl group, a cyclohexyl group, a mono- or dialkylaminoalkyl group, or a cyano lower alkyl group;

$R_2$ represents a hydrogen atom or a methoxy group;

$R_3$ represents an anilino group substituted with a group selected from the group consisting of a sulfo group, a carboxy group, an alkoxy group, a carbamoyl group, a cyano group, an alkyl group, an anilino group, a phenoxy group, an amino group, a hydroxy group and a mercapto group, or an unsubstituted anilino group; a mono- or dialkylamino group substituted with a group selected from the group consisting of a sulfo group, a carboxy group, an alkoxy group, a carbonyl group, a carbamoyl group, a cyano group, an anilino group, a phenoxy group, an amino group, a hydroxy group, a mercapto group and a phenyl group, or an unsubstituted mono- or dialkylamino group; a phenylthio group substituted with a group selected from the group consisting of a sulfo group, a carboxy group, an alkoxy group, a carbonyl group, a carbamoyl group, a cyano group, an alkyl group, an anilino group, a phenoxy group, an amino group, a hydroxy group and a mercapto group, or an unsubstituted phenylthio group; an alkylthio group substituted with a group selected from the group consisting of a sulfo group, a carboxy group, an alkoxy group, a carbonyl group, a carbamoyl group, a cyano group, an anilino group, a phenoxy group, an amino group, a hydroxy group, a mercapto group and a phenyl group, or an unsubstituted alkylthio group; a sulfoanilino group substituted with a methyl group, a methoxy group or a carboxy group; a carboxy-substituted hydroxyanilino group; a sulfo group-substituted naphthylamino group, or an unsubstituted naphthylamino group; a phenoxy group substituted with a group selected from the group consisting of a sulfo group, a carboxy group, an acetylamino group, an amino group, a hydroxy group, a phenoxy group and a phenyl group, or an unsubstituted phenoxy group; a monoalkylaminoalkylamino group; a dialkylaminoalkylamino group; a hydroxy group; a mercapto group; or an amino group;

provided that all the aforementioned groups and substituents represented by $R_1$ to $R_3$ have a hydrogen atom, the hydrogen atom may be substituted with a group other than a hydrogen atom.

A second aspect of the invention provides the ink set for ink-jet recording according to the first aspect, wherein the cyan dye represented by the above formula (7) contained in the cyan ink composition is a dye obtained by allowing a compound represented by the following formula (8) to react with an organic amine represented by the following formula (9) in the presence of ammonia or a source of ammonia generation, or a salt thereof:

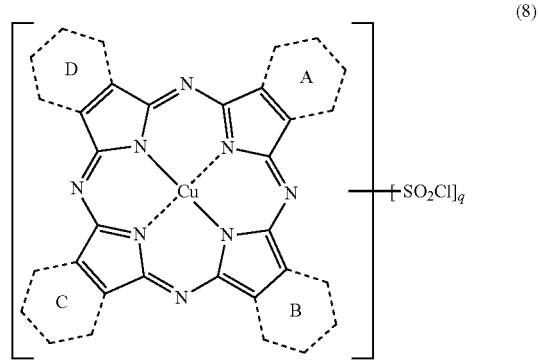

(8)

in the formula (8), rings A to D are defined similarly to those in the formula (7), and q is a number of from 1 to 3;

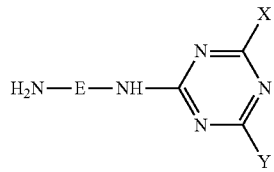

(9)

in the formula (9), E, X, and Y are defined similarly to those in the formula (7).

A third aspect of the invention provides the ink set for ink-jet recording according to the first aspect, wherein the magenta dye represented by the above formula (6) or a salt thereof is a dye represented by the following formula (10) or a salt thereof:

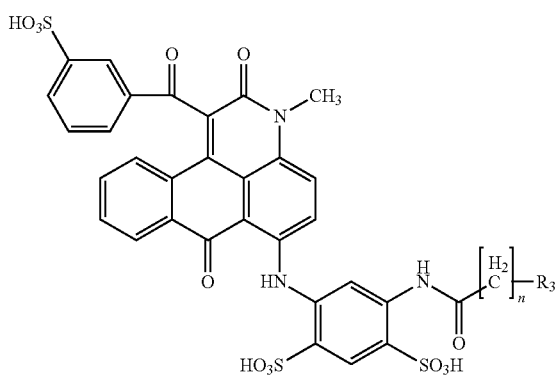

(10)

in the formula (10), n and $R_3$ are defined similarly to those in the formula (6).

A fourth aspect of the invention provides the ink set for ink-jet recording according to the first aspect, wherein the cyan dye represented by the above formula (7) or a salt thereof contained in the cyan ink composition is a dye represented by the following formula (11) or a salt thereof:

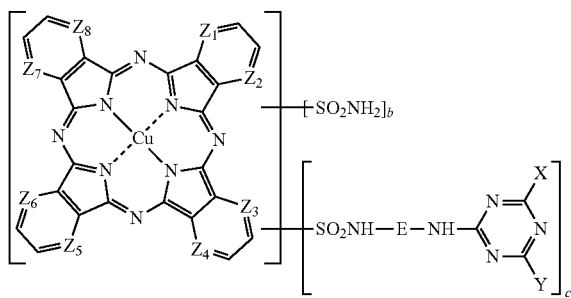

(11)

in the formula (11), $Z_1$ to $Z_8$ each independently represent a nitrogen atom or CH, and among four combinations of $Z_1$ and $Z_2$, $Z_3$ and $Z_4$, $Z_5$ and $Z_6$, and $Z_7$ and $Z_8$, at least one is a combination of CH and CH, any one is not a combination of nitrogen atoms, and not all the four combinations are CH and CH; and E, X, Y, b, and c are defined similarly to those in the formula (7).

A fifth aspect of the invention provides the ink set for ink-jet recording according to the second aspect, wherein the compound represented by the above formula (8) is a compound represented by the following formula (12):

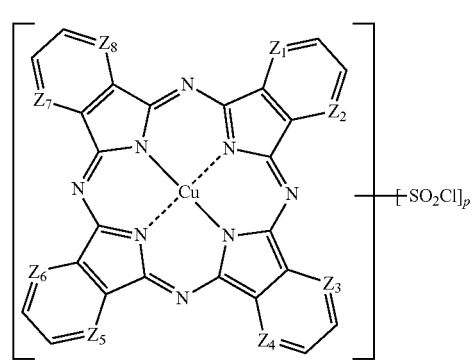

(12)

in the formula (12), $Z_1$ to $Z_8$ each independently represent a nitrogen atom or CH, and among four combinations of $Z_1$ and $Z_2$, $Z_3$ and $Z_4$, $Z_5$ and $Z_6$, and $Z_7$ and $Z_8$, at least one is a combination of CH and CH, any one is not a combination of nitrogen atoms, and not all the four combinations are CH and CH; and p is a number of from 1 to 3.

A sixth aspect of the invention provides the ink set for ink-jet recording according to the first aspect, wherein the total content of the cyan dye in the total mass of the cyan ink composition is 2.0 to 6.0% by mass.

A seventh aspect of the invention provides the ink set for ink-jet recording according the first aspect, wherein the total content of the magenta dye in the total mass of the magenta ink composition is 1.0 to 8.0% by mass.

An eighth aspect of the invention provides the ink set for ink-jet recording according to the first aspect, which is a three-color ink set including three kinds of ink compositions composed of a yellow ink composition in addition to the two kinds of ink compositions including the cyan ink composition and the magenta ink composition.

A ninth aspect of the invention provides the ink set for ink-jet recording according to the eighth aspect, wherein the total content of a yellow dye in the total mass of the yellow ink composition is 1.0 to 5.0% by mass.

A tenth aspect of the invention provides an ink jet recording method including discharging ink droplets of each ink of the ink set according to the first aspect in response to recording signals to execute recording by allowing the ink to adhere on a record-receiving material An eleventh aspect of the invention provides the ink jet recording method according to the tenth aspect, wherein the record-receiving material is a communication sheet.

A twelfth aspect of the invention provides the ink jet recording method according to the eleventh aspect, wherein the communication sheet is a plain paper or a sheet having an ink image receiving layer containing a porous white inorganic substance.

A thirteenth aspect of the invention provides a colored object which was colored with the ink set according to the first aspect.

A fourteenth aspect of the invention provides the colored object according to the thirteenth aspect, wherein the coloring was carried out with an ink jet printer.

A fifteenth aspect of the invention provides an ink jet printer equipped with vessels each containing the ink composition of the ink set according to the first aspect.

Effects of the Invention

Each of the water soluble dyes represented by the above formula (7) or (6) or a salt thereof contained in each ink composition of cyan and magenta composing the ink set of the present invention is each extremely superior in solubility in water. Additionally, these dyes are characterized by having, for example, favorable filterability through membrane filters, in the step of producing an ink, thereby providing a very brilliant colored image with a high brightness on an ink jet recording paper. Moreover, an ink composition containing these dyes exhibits extremely favorable storage stability as compared with conventional products, without being accompanied by crystal precipitation, physical property alteration, change in the hue and the like after storage for a long period of time. Therefore, an ink jet printer equipped with the ink set of the present invention obviates the occurrence of disadvantages such as discharge failure, and is thus highly reliable.

Moreover, a printed matter obtained using the ink set of the present invention for ink jet recording enables a highly brilliant and extremely highly dense photographic color image to be strictly reproduced on a record-receiving material without limitation of usable record-receiving material (for example, paper, film, etc.). Additionally, even though recording is carried out on a record-receiving material including a porous white inorganic substance coated on its surface, such as an exclusive ink jet paper for photo image quality and a film, favorable various fastness properties i.e., water resistance, moisture resistance, gas resistance, light resistance and the like, as well as superior long-term storage stability of photographic recorded image can be achieved. Accordingly, the ink set of the present invention is extremely useful as an ink set for ink jet recording.

PREFERRED MODE FOR CARRYING OUT THE INVENTION

The present invention is explained in detail below. Unless otherwise stated in particular herein, acidic functional groups such as sulfo groups and carboxy groups are represented in the form of their free acids. In addition, unless specified in particular herein below, the "dye or a salt thereof" contained in each ink composition composing the ink set of the present invention is referred merely to as "dye" to include both of the dye and the salt thereof.

In the ink set of the present invention, the cyan ink composition is characterized by containing a cyan dye represented by the above formula (7).

The formula (7) represents a cyan dye prepared by introducing an unsubstituted sulfamoyl group and a certain substituted sulfamoyl group to impart water solubility and various fastness properties to a pigment derived from tetrabenzoporphyrazine (in general, referred to as phthalocyanine) by replacing one to three among four benzo (benzene) rings with a nitrogen-containing heteroaromatic ring.

In the above formula (7), the rings A to D each independently represent a benzene ring or a six-membered nitrogen-containing heteroaromatic ring; and at least one of them is a nitrogen-containing heteroaromatic ring, and at least one of the rest represents a benzene ring. Therefore, an ink set composed of a cyan ink composition containing a single cyan dye alone in which all the four rings A to D concomitantly represent a nitrogen-containing heteroaromatic ring or a benzene ring is not included in the present invention.

The nitrogen-containing heteroaromatic ring in the rings A to D is exemplified by a six-membered nitrogen-containing heteroaromatic ring that contains 1 to 2 nitrogen atoms such as for example, a pyridine ring, a pyrazine ring, a pyrimidine ring, and a pyridazine ring. Although these nitrogen-containing heteroaromatic rings may be independently selected as rings A to D, the same type of the ring is preferably selected. Among the examples presented above, a pyridine ring or a pyrazine ring is preferred, and a pyridine ring is more preferred. Among the rings A to D, 1 to 3 rings represent a nitrogen-containing heteroaromatic ring, and the rest represents a benzene ring.

As the number of the nitrogen-containing heteroaromatic ring increases, the ozone resistance is improved; however, the bronzing property tends to be exhibited. Thus, the number of the nitrogen-containing heteroaromatic ring in the rings A to D may be selected to provide a well balanced proportion by appropriately adjusting while taking into consideration the ozone resistance and the bronzing property. Although the number of the nitrogen-containing heteroaromatic ring is not necessarily defined since it may vary depending on the type of the heteroaromatic ring, it is generally, in terms of a mean value, in the range of preferably 1.0 to 2.0, more preferably 1.0 to 1.7, and still more preferably 1.0 to 1.5, whereas the rest is a benzene ring. When the number of the nitrogen-containing heteroaromatic ring is greater than 1 and less than 2, the number is the mean value of the number of the heteroaromatic ring in the mixture of the compound having one heteroaromatic ring, and a compound having two heteroaromatic rings.

When two heteroaromatic rings are included, any of the type, in which the two heteroaromatic rings are adjacent with each other (for example, rings A and B) or opposing to one another (for example, rings A and C) is believe to occur. As a detailed description of compounds represented by structural formula will be overly complicated when explaining the process for production or Examples, and as discrimination of each compound is not necessary in the present invention, unless otherwise specifically stated the structural formula of one of the compounds in which two rings A and C represent a heteroaromatic ring, and the rings B and D represent a benzene ring is described for the sake of simplicity, which should be construed to suggest all of the both compounds that may occur as described above.

The alkylene in E is exemplified by, for example, alkylene having 2 to 12 carbon atoms, and more preferably alkylene having 2 to 6 carbon atoms. Specific examples include ethylene, propylene, butylene, pentylene, hexylene, cyclopropylenediyl, 1,2- or 1,3-cyclopentylenediyl, each cyclohexylene of 1,2-, 1,3-, 1,4-cyclohexylene, and the like. Preferable alkylene is ethylene, propylene, or butylene, and ethylene is more preferred.

X represents an anilino group or a naphthylamino group having at least one sulfo group, carboxy group, or phosphoric acid group as a substituent.

The anilino group or naphthylamino group may be further substituted with one, or at least two substituents selected from the group consisting of a sulfo group, a carboxy group, a phosphoric acid group, a sulfamoyl group, a carbamoyl group, a hydroxy group, an alkoxy group, an amino group, a mono- or dialkylamino group, a mono- or diarylamino group, an acetylamino group, an ureide group, an alkyl group, a nitro group, a cyano group, a halogen atom, an alkylsulfonyl group, and an alkylthio group. Among the one, or at least two substituents selected from the group described above, preferable substituents include a sulfo group, a carboxy group, and a hydroxy group. Alternatively, when X is a naphthylamino group, sulfo and hydroxy groups are preferred among the aforementioned substituents. The number of substitution with the substituent selected from the group described above is, when X is an anilino group, usually 0 to 2, preferably 0 or 1, and more preferably 0. Similarly, when X is a naphthylamino group, the number of substitutions is usually 0 to 4, and preferably 0 to 2.

Specific examples of X include 2,5-disulfoanilino, 2-sulfoanilino, 3-sulfoanilino, 4-sulfoanilino, 2-carboxyanilino, 4-carboxyanilino, 4-ethoxy-2-sulfoanilino, 2-methyl-5-sulfoanilino, 2-methoxy-4-nitro-5-sulfoanilino, 2-chloro-5-sulfoanilino, 3-carboxy-4-hydroxyanilino, 3-carboxy-4-hydroxy-5-sulfoanilino, 2-hydroxy-5-nitro-3-sulfoanilino, 4-acetylamino-2-sulfoanilino, 4-anilino-3-sulfoanilino, 3,5-dichloro-4-sulfoanilino, 3-phosphonoanilino, 3,5-dicarboxyanilino, 2-carboxy-4-sulfoanilino, 2-carboxy-5-sulfoanilino, 5,7-disulfonaphthalene-2-ylamino, 6,8-disulfonaphthalene-2-ylamino, 3,6-disulfonaphthalene-1-ylamino, 3,6,8-trisulfonaphthalene-1-ylamino, 8-hydroxy-3,6-disulfonaphthalene-1-ylamino, 4,8-disulfonaphthalene-2-ylamino, 3,6,8-trisulfonaphthalene-2-ylamino, 4,6,8-trisulfonaphthalene-2-ylamino, 8-chloro-3,6-disulfonaphthalene-1-ylamino, 8-hydroxy-6-sulfonaphthalene-2-ylamino, 5-hydroxy-7-sulfonaphthalene-2-ylamino, and the like. Among these, particularly preferred is 4-sulfoanilino.

Y represents an amino group; a hydroxy group; or a mono- or dialkylamino group or nitrogen-containing heterocycle group which may have one, or at least two substituents selected from the group consisting of a sulfo group, a carboxy group, a phosphoric acid group, a sulfamoyl group, a carbamoyl group, a hydroxy group, an alkoxy group, a hydroxyalkoxy group, an amino group, a mono- or dialkylamino group, a mono- or diarylamino group, an acetylamino group, an ureide group, an alkyl group, a nitro group, a cyano group, a halogen atom, an alkylsulfonyl group, and an alkylthio group. However, combinations in which Y represents an amino group or a hydroxy group, and X represents a substituted anilino group are excluded, and these are not included in the range of the present invention.

Y is more preferably a mono- or dialkylamino group which may have a substituent, and more preferably a monoalkylamino group which may have a substituent. The alkyl moiety of the mono- or dialkylamino group has usually 1-8 carbon atoms (C1-C8), preferably 1-6 carbon atoms (C1-C6), and more preferably 1-4 carbon atoms (C1-C4).

When Y has one, or at least two substituents selected from the group described above, the number of the substituent is usually 1 to 4, preferably 1 to 3, more preferably 1 to 2, and still more preferably 1. Moreover, among the substituents selected from the group described above, a sulfo group, a carboxy group and a hydroxyalkoxy group are preferred, and a sulfo group is more preferred.

When the substituent of Y is an alkoxy group, it has usually 1-8 carbon atoms (C1-C8), preferably 1-6 carbon atoms (C1-C6), and more preferably 1-4 carbon atoms (C1-C4).

When Y is a monoalkylamino group which may have a substituent, specific examples thereof include 2-sulfoethylamino, 2-carboxyethylamino, carboxymethylamino, 2-hydroxyethylamino, 2-ethoxy-2-ethylamino, 1-hydroxybutylamino, 5-carboxypentylamino, 2-methoxy-ethylamino, 2-hydroxyethyl-2-ethoxyamino, 2-ethoxyethylamino and the like, and among these, 2-sulfoethylamino is preferred.

When Y is a dialkylamino group which may have a substituent, specific examples thereof include di(2-hydroxyethyl)amino, di(2-carboxyethyl)amino, and the like.

When Y is a nitrogen-containing heterocycle group, examples thereof include six- or five-membered heterocycle containing 1 to 2 nitrogen atoms such as morpholino, 4-methylpiperidino, piperidino, pyrrolidino, 2-carboxy-pyrrolidino, and 4-ethyl-piperazino.

The substituent in this case may be also as described above, and the number of the substituent is usually 0 to 4, preferably 0 to 3, more preferably 0 to 1, and still more preferably 0.

Specific examples of preferable substituent include methyl, ethyl, sulfo, carboxy and hydroxy, and methyl, ethyl and carboxy are more preferred.

"b" is 0 to 2.9 in terms of the mean value, whereas "c" is 0.1 to 3 similarly in terms of the mean value. In addition, the total value of b and c is 1 to 3. As "b" becomes greater, the ozone resistance tends to be improved, but the bronzing property tends to be exhibited. Thus, the values of b and c may be selected to provide a well balanced proportion by appropriately adjusting while taking into consideration the ozone resistance and the bronzing property. The values b and c may be determined by measuring the content of copper and the inorganic substance in the compound, and calculating the average molecular weight.

Specific examples of the rings A to D, E, X and Y, and the values of b and c in the cyan dye represented by the above formula (7) of the present invention are shown in Table 1 below.

The examples as in the following indicate typical compounds for specifically explaining the dye of the present invention, and the present invention is not limited to these specific examples.

In addition, when the nitrogen-containing heteroaromatic ring of A, B, C or D represents a pyridine ring, position isomers of the nitrogen atom are present as described later, and a mixture of the isomers is obtained when the dye is synthesized. Separation of such isomers is difficult, and identification of the isomer by analysis is also difficult. Thus, such mixtures are directly used in general. Since a problem is not particularly caused even if the isomer mixture is used in the present invention, notation with the structural formula uses just one structural formula without distinguishing these isomers for the sake of simplicity herein, as described above.

TABLE 1

| Dye No. | A | B | C | D | E | X | Y | b | c |
|---|---|---|---|---|---|---|---|---|---|
| C-1 | 2,3-pyrido | benzo | benzo | benzo | ethylene | 4-sulfoanilino | 2-hydroxyethylamino | 2 | 1 |
| C-2 | 2,3-pyrido | benzo | benzo | benzo | ethylene | 6-sulfo-1-naphthylamino | 2-sulfoethylamino | 2 | 1 |
| C-3 | 2,3-pyrido | benzo | benzo | benzo | ethylene | 3,8-disulfo-1-naphthylamino | amino | 2 | 1 |
| C-4 | 2,3-pyrido | benzo | benzo | benzo | ethylene | 3,6-disulfo-1-naphthylamino | 2-hydroxyethyl-2-ethoxyamino | 2 | 1 |

TABLE 1-continued

| Dye No. | A | B | C | D | E | X | Y | b | c |
|---|---|---|---|---|---|---|---|---|---|
| C-5 | 2,3-pyrido | benzo | benzo | benzo | ethylene | 4-sulfoanilino | 2-hydroxyethyl-2-ethoxyamino | 2 | 1 |
| C-6 | 2,3-pyrido | benzo | benzo | benzo | ethylene | 3,8-disulfo-1-naphthylamino | morpholino | 2 | 1 |
| C-7 | 2,3-pyrido | benzo | benzo | benzo | ethylene | 6,8-disulfo-2-naphthylamino | morpholino | 2 | 1 |
| C-8 | 2,3-pyrido | benzo | benzo | benzo | ethylene | 6-sulfo-1-naphthylamino | 2-sulfoethylamino | 2 | 1 |
| C-9 | 2,3-pyrido | benzo | benzo | benzo | ethylene | 3,8-disulfo-1-naphthylamino | amino | 2 | 1 |
| C-10 | 2,3-pyrido | benzo | benzo | benzo | ethylene | 3,6-disulfo-1-naphthylamino | 2-hydroxyethyl-2-ethoxyamino | 2 | 1 |
| C-11 | 2,3-pyrido | benzo | benzo | benzo | ethylene | 4-sulfoanilino | 2-hydroxyethyl-2-ethoxyamino | 2 | 1 |
| C-12 | benzo | benzo | 2,3-pyrido | benzo | ethylene | 3,8-disulfo-1-naphthylamino | morpholino | 2 | 1 |
| C-13 | benzo | benzo | 2,3-pyrido | benzo | ethylene | 6,8-disulfo-2-naphthylamino | morpholino | 2 | 1 |
| C-14 | 2,3-pyrido | benzo | benzo | benzo | ethylene | 2,5-disulfoanilino | morpholino | 2 | 1 |
| C-15 | 2,3-pyrido | benzo | benzo | benzo | ethylene | 2,4-disulfoanilino | morpholino | 2 | 1 |
| C-16 | 2,3-pyrido | benzo | benzo | benzo | ethylene | 3-sulfoanilino | 2-sulfoethylamino | 2 | 1 |
| C-17 | 2,3-pyrido | benzo | benzo | benzo | ethylene | 4-sulfoanilino | 2-sulfoethylamino | 2 | 1 |
| C-18 | 2,3-pyrido | benzo | benzo | benzo | ethylene | 4-sulfoanilino | bis(2-carboxyethyl)amino | 2 | 1 |
| C-19 | 2,3-pyrido | benzo | benzo | benzo | ethylene | 3,5-dicarboxyanilino | 2-sulfoethylamino | 2 | 1 |
| C-20 | 2,3-pyrido | benzo | benzo | benzo | ethylene | 2,5-disulfoanilino | 4-ethylpiperadino | 2 | 1 |
| C-21 | 2,3-pyrido | benzo | benzo | benzo | ethylene | 2,5-disulfoanilino | 2-ethylpiperidino | 2 | 1 |
| C-22 | 2,3-pyrido | benzo | benzo | benzo | ethylene | 2,5-disulfoanilino | 3-methylpyrrolidino | 2 | 1 |
| C-23 | 2,3-pyrido | benzo | benzo | benzo | ethylene | 2,5-disulfoanilino | 2-carboxypyrrolidino | 2 | 1 |
| C-24 | 2,3-pyrido | benzo | benzo | benzo | ethylene | 2,5-disulfoanilino | pyrrolidino | 2 | 1 |
| C-25 | 2,3-pyrido | 2,3-pyrido | benzo | benzo | ethylene | 3,8-disulfo-1-naphthylamino | amino | 1 | 1 |
| C-26 | 2,3-pyrido | benzo | 2,3-pyrido | benzo | ethylene | 3,6-disulfo-1-naphthylamino | 2-hydroxyethyl-2-ethoxyamino | 1 | 1 |
| C-27 | 2,3-pyrido | 2,3-pyrido | benzo | benzo | ethylene | 4-sulfoanilino | 2-hydroxyethyl-2-ethoxyamino | 1 | 1 |
| C-28 | 2,3-pyrido | 2,3-pyrido | benzo | benzo | ethylene | 3,8-disulfo-1-naphthylamino | morpholino | 1 | 1 |
| C-29 | 2,3-pyrido | 2,3-pyrido | benzo | benzo | ethylene | 6,8-disulfo-2-naphthylamino | morpholino | 1 | 1 |
| C-30 | 2,3-pyrido | benzo | 2,3-pyrido | benzo | ethylene | 2,5-disulfoanilino | morpholino | 1 | 1 |
| C-31 | 2,3-pyrido | benzo | 2,3-pyrido | benzo | ethylene | 2,4-disulfoanilino | morpholino | 1 | 1 |
| C-32 | 2,3-pyrido | benzo | 2,3-pyrido | benzo | propylene | 4-sulfoanilino | 2-hydroxyethylamino | 1 | 1 |
| C-33 | 2,3-pyrido | benzo | 2,3-pyrido | benzo | ethylene | 3,5-dicarboxyanilino | 2-sulfoethylamino | 1 | 1 |
| C-34 | 2,3-pyrido | 2,3-pyrido | benzo | benzo | ethylene | 3-sulfoanilino | 2-sulfoethylamino | 1 | 1 |
| C-35 | 2,3-pyrido | benzo | 2,3-pyrido | benzo | ethylene | 4-sulfoanilino | 2-sulfoethylamino | 1 | 1 |
| C-36 | 2,3-pyrido | benzo | 2,3-pyrido | benzo | ethylene | 4-sulfoanilino | bis(2-carboxyethyl)amino | 1 | 1 |
| C-37 | 2,3-pyrido | benzo | 2,3-pyrido | benzo | butylene | 6-sulfo-1-naphthylamino | 2-sulfoethylamino | 1 | 1 |
| C-38 | 2,3-pyrido | benzo | 2,3-pyrido | benzo | ethylene | 3,8-disulfo-1-naphthylamino | amino | 1 | 1 |
| C-39 | 2,3-pyrido | benzo | 2,3-pyrido | benzo | ethylene | 3,6-disulfo-1-naphthylamino | 2-hydroxyethyl-2-ethoxyamino | 1 | 1 |
| C-40 | 2,3-pyrido | 2,3-pyrido | 2,3-pyrido | benzo | ethylene | 4-sulfoanilino | 2-hydroxyethyl-2-ethoxyamino | 0 | 1 |
| C-41 | 2,3-pyrido | 2,3-pyrido | 2,3-pyrido | benzo | ethylene | 3,8-disulfo-1-naphthylamino | morpholino | 0 | 1 |
| C-42 | 2,3-pyrido | 2,3-pyrido | 2,3-pyrido | benzo | ethylene | 6,8-disulfo-2-naphthylamino | morpholino | 0 | 1 |

TABLE 1-continued

| Dye No. | A | B | C | D | E | X | Y | b | c |
|---|---|---|---|---|---|---|---|---|---|
| C-43 | 2,3-pyrido | 2,3-pyrido | 2,3-pyrido | benzo | ethylene | 2,5-disulfoanilino | morpholino | 0 | 1 |
| C-44 | 2,3-pyrido | 2,3-pyrido | 2,3-pyrido | benzo | ethylene | 2,4-disulfoanilino | morpholino | 0 | 1 |
| C-45 | 2,3-pyrido | 2,3-pyrido | 2,3-pyrido | benzo | ethylene | 3,5-dicarboxyanilino | 2-sulfoethylamino | 0 | 1 |
| C-46 | 2,3-pyrido | 2,3-pyrido | benzo | 2,3-pyrido | ethylene | 4-sulfoanilino | 2-hydroxyethylamino | 0 | 1 |
| C-47 | 2,3-pyrido | 2,3-pyrido | benzo | 2,3-pyrido | ethylene | 6-sulfo-1-naphthylamino | 2-sulfoethylamino | 0 | 1 |
| C-48 | 2,3-pyrido | benzo | 2,3-pyrido | 2,3-pyrido | ethylene | 3,6,8-trisulfo-1-naphthylamino | morpholino | 0 | 1 |
| C-49 | 2,3-pyrido | benzo | 2,3-pyrido | 2,3-pyrido | ethylene | 3,6,8-trisulfo-1-naphthylamino | 2-sulfoethylamino | 0 | 1 |
| C-50 | benzo | 2,3-pyrido | 2,3-pyrido | 2,3-pyrido | ethylene | 3,6,8-trisulfo-1-naphthylamino | 2-hydroxyethylamino | 0 | 1 |
| C-51 | benzo | 2,3-pyrido | 2,3-pyrido | 2,3-pyrido | ethylene | 3,6,8-trisulfo-1-naphthylamino | 2-hydroxyethyl-2-ethoxyamino | 0 | 1 |
| C-52 | 2,3-pyrido | benzo | benzo | 2,3-pyrido | butylene | 2,5-disulfoanilino | 4-ethylpiperadino | 1 | 1 |
| C-53 | 2,3-pyrido | benzo | benzo | 2,3-pyrido | butylene | 2,5-disulfoanilino | 2-ethylpiperidino | 1 | 1 |
| C-54 | 2,3-pyrido | benzo | benzo | 2,3-pyrido | butylene | 2,5-disulfoanilino | 3-methylpyrrolidino | 1 | 1 |
| C-55 | 2,3-pyrido | benzo | benzo | 2,3-pyrido | butylene | 2,5-disulfoanilino | 2-carboxypyrrolidino | 1 | 1 |
| C-56 | 2,3-pyrido | benzo | benzo | 2,3-pyrido | butylene | 2,5-disulfoanilino | pyrrolidino | 1 | 1 |
| C-57 | 2,3-pyrido | benzo | 2,3-pyrido | benzo | propylene | 2,5-disulfoanilino | 4-ethylpiperadino | 1 | 1 |
| C-58 | 2,3-pyrido | benzo | 2,3-pyrido | benzo | propylene | 2,5-disulfoanilino | 2-ethylpiperidino | 1 | 1 |
| C-59 | 2,3-pyrido | benzo | 2,3-pyrido | benzo | propylene | 2,5-disulfoanilino | 3-methylpyrrolidino | 1 | 1 |
| C-60 | 2,3-pyrido | benzo | 2,3-pyrido | benzo | propylene | 2,5-disulfoanilino | 2-carboxypyrrolidino | 1 | 1 |
| C-61 | 2,3-pyrido | benzo | 2,3-pyrido | benzo | propylene | 2,5-disulfoanilino | pyrrolidino | 1 | 1 |
| C-62 | 2,3-pyrido | 2,3-pyrido | 2,3-pyrido | benzo | ethylene | 2,5-disulfoanilino | 4-ethylpiperadino | 0 | 1 |
| C-63 | 2,3-pyrido | 2,3-pyrido | 2,3-pyrido | benzo | ethylene | 2,5-disulfoanilino | 2-ethylpiperidino | 0 | 1 |
| C-64 | 2,3-pyrido | 2,3-pyrido | 2,3-pyrido | 2,3-pyrido | ethylene | 2,5-disulfoanilino | 3-methylpyrrolidino | 0 | 1 |

The cyan ink composition of the present invention contains only the cyan dye represented by the above formula (7) or a mixture thereof as a cyan dye; however, a cyan dye other than those represented by the above formula (7) may be contained in the range that does not deteriorate the effects of the present invention.

In addition, it is quite difficult to synthesize a single cyan dye represented by the above formula (7) with a high purity. Therefore, when a cyan dye in which one of the rings A to D represents a nitrogen-containing heteroaromatic ring, and the remaining three rings represent a benzene ring is to be obtained, a mixture including the compound in which the rings A to D all represent a benzene ring, the compound in which one of the rings represents a nitrogen-containing heteroaromatic ring, the compound in which two of the rings represent a nitrogen-containing heteroaromatic ring, and the compound in which three of the rings represent a nitrogen-containing heteroaromatic ring will be obtained in usual case. By controlling the reaction conditions and the like when this mixture is obtained, control of the generation rate of each compound generated is enabled; therefore, the cyan dye represented by the above formula (7) in which one of the rings A to D represents a nitrogen-containing heteroaromatic ring, and the remaining three rings represent a benzene ring, in terms of the mean value as described above, can be obtained.

The number of the nitrogen-containing heteroaromatic ring in the rings A to D may be determined by carrying out an elemental analysis to measure carbon atoms, hydrogen atoms, nitrogen atoms, and copper atoms.

In addition, when a mixture with a well-known cyan dye is used, the dye to be mixed is preferably a phthalocyanine dye. The ratio of the cyan dye of the present invention to the other dye when such a mixture is used may be determined appropriately depending on the intended use, and the like. For example, the cyan dye of the present invention accounts for 1 to 100%, preferably 10 to 95%, and more preferably 25 to 90% of the mixture, and the rest is other dye, for example, a phthalocyanine dye.

It is to be noted that any of the aforementioned "%" means % by mass.

The production method of the compound represented by the above formula (7) is explained below.

First, a copper porphyrazine compound (pigment) represented by the following formula (30) is synthesized. The copper porphyrazine compound represented by the following formula (30) is obtained by, for example, allowing a dicarboxylic acid having a nitrogen-containing heteroaromatic ring or a derivative thereof (hereinafter, referred to as "dicarboxylic acid derivative having a nitrogen-containing heteroaromatic ring") to react with a phthalic acid or a derivative thereof (hereinafter, referred to as "phthalic acid derivative") in the presence of a catalyst and a copper compound. By changing the molar ratio in the reaction of the dicarboxylic acid derivative having a nitrogen-containing heteroaromatic ring and the phthalic acid derivative, the number of the nitrogen-containing heteroaromatic ring and the number of the benzene ring in the rings A to D can be adjusted. Although a compound in which all the rings A to D in the compound represented by the following formula (30) represent a nitrogen-containing heteroaromatic ring may be generated according to the circumstances, such a compound can be eliminated from the intended substance by washing with an acid, particularly by washing with an aqueous solution of a mineral acid such as hydrochloric acid or sulfuric acid. When the cyan dye represented by the above formula (7) is produced from the compound represented by the following formula (30), it is desired to remove the compound in which all the rings A to D represent a nitrogen-containing heteroaromatic ring.

For example, in the case of the cyan dye represented by the above formula (7) in which one to three of the rings A to D represent a nitrogen-containing heteroaromatic ring, and the rest represents a benzene ring, the intended compound can be obtained by using the dicarboxylic acid derivative having a nitrogen-containing heteroaromatic ring and the phthalic acid derivative at a rate in the range of 0.25 to 0.75 mol, respectively, such that the total of the both derivatives corresponds to 1 mol, depending on the ratio to be contained.

For example, when one represents a nitrogen-containing heteroaromatic ring, and three represents a benzene ring are to be included, 0.25 mol of the dicarboxylic acid derivative having a nitrogen-containing heteroaromatic ring and 0.75 mol of the phthalic acid derivative may be used.

As the dicarboxylic acid derivative having a nitrogen-containing heteroaromatic ring, a dicarboxylic acid derivative having a nitrogen-containing heteroaromatic ring which has a carboxy group, or a reactive group derived therefrom (acid amide group, imide group, acid anhydride group, carbonitrile group, etc.) at adjacent two positions may be exemplified.

Specific examples include dicarboxylic acid compounds such as quinolinic acid, 3,4-pyridinedicarboxylic acid and 2,3-pyrazinedicarboxylic acid, acid anhydrides such as quinolinic anhydride, 3,4-pyridinedicarboxylic anhydride and 2,3-pyrazinedicarboxylic anhydride, amide compounds such as pyridine-2,3-dicarboxyamide, dicarboxylic acid monoamide compounds such as pyrazine-2,3-dicarboxylic acid monoamide, acid imide compounds such as quinolinic acid imide, and dicarbonitrile compounds such as pyridine-2,3-dicarbonitrile and pyrazine-2,3-dicarbonitrile.

In addition, phthalic acid derivatives may include phthalic acid, phthalic anhydride, phthalamide, phthalamic acid, phthalimide, phthalonitrile, 1,3-diiminoisoindoline, 2-cyanobenzamido, and the like.

There are two methods for synthesizing a copper porphyrazine compound, generally referred to as a nitrile method and a Wyler method, which are different in regard to reaction conditions and the like.

In the nitrile method, a dicarbonitrile compound such as pyridine-2,3-dicarbonitrile, pyrazine-2,3-dicarbonitrile or phthalonitrile is used as a starting material to synthesize porphyrazine.

On the other hand, in the Wyler method, a dicarboxylic acid compound such as phthalic acid, quinolinic acid, 3,4-pyridinedicarboxylic acid or 2,3-pyrazinedicarboxylic acid, an acid anhydride compound such as phthalic anhydride, quinolinic anhydride, 3,4-pyridinedicarboxylic anhydride or 2,3-pyrazinedicarboxylic anhydride, a dicarboxamide compound such as phthalamide or pyridine-2,3-dicarboxyamide, a dicarboxylic acid monoamide compound such as phthalamic acid or pyrazine-2,3-dicarboxylic acid monoamide, an acid imide compound such as phthalimide or quinolinic acid imide is used as a starting material. Moreover, it is necessary to add urea in the Wyler method, and the amount of urea used is 5 to 100 times by mol per mol of the dicarboxylic acid derivative having a nitrogen-containing heteroaromatic ring and the phthalic acid derivative in total.

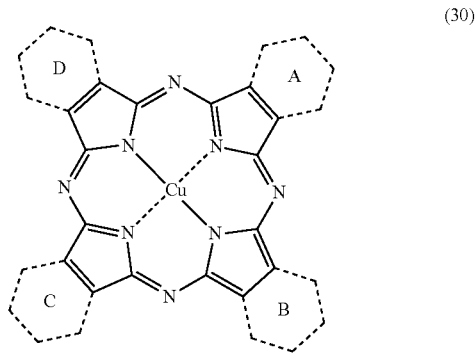

(30)

In the above formula (30), rings A to D are defined similarly to those described above.

The reaction is carried out in the presence of a solvent, and an organic solvent having a boiling point of no lower than 100° C., and more preferably no lower than 130° C. is used as the solvent in the nitrile method. Examples of the organic solvent include n-amyl alcohol, n-hexanol, cyclohexanol, 2-methyl-1-pentanol, 1-heptanol, 1-octanol, 2-ethylhexanol, N,N-dimethylaminoethanol, benzyl alcohol, ethylene glycol, propylene glycol, trichlorobenzene, chloronaphthalene, nitrobenzene, quinoline, sulfolane, urea, and the like.

Furthermore, in the Wyler method, an aprotic organic solvent having a boiling point of no lower than 150° C., more preferably no lower than 180° C. is used as the solvent. For example, trichlorobenzene, chloronaphthalene, nitrobenzene, quinoline, sulfolane, urea and the like may be exemplified.

The amount of the solvent used is 1 to 100 times by mass relative to the total mass of the dicarboxylic acid derivative having a nitrogen-containing heteroaromatic ring and the phthalic acid derivative.

As the catalyst, the following compounds may be used.

For the nitrile method, amines such as quinoline, 1,8-diazabicyclo[5,4,0]-7-undecene, tributylamine, ammonia and N,N-dimethylaminoethanol, alkali metal alcoholates such as sodium ethoxide and sodium methoxide may be exemplified.

Moreover, for the Wyler method, ammonium molybdate, boric acid, and the like may be exemplified.

The amount of the catalyst added may be 0.001 to 1 times by mol per mol of the dicarboxylic acid derivative having a nitrogen-containing heteroaromatic ring and the phthalic acid derivative in total.

As the copper compound, metal copper, halides, carboxylate salts, sulfate salts, nitrate salts, acetylacetonate, complexes and the like of copper may be exemplified. For example, copper chloride, copper bromide, copper acetate, copper acetylacetonate, and the like may be exemplified.

When synthesis of porphyrazine having a central metal other than copper is intended, a corresponding metal salt may be used or an exchange reaction of a central metal may be carried out according to a conventional method after synthesizing a porphyrazine ring.

The amount of the copper compound used is 0.15 to 0.35 times by mol per mol of the dicarboxylic acid derivative having a nitrogen-containing heteroaromatic ring and the phthalic acid derivative in total.

In the nitrile method, the reaction temperature is usually 100 to 200° C., and preferably 130 to 170° C.

On the other hand, the reaction temperature is 150 to 300° C., and preferably 170 to 220° C. in the Wyler method.

The reaction time period may vary depending on the reaction conditions, and is usually 1 to 40 hrs. After completing the reaction, the intended product is subjected to filtration, washing, and drying to obtain a copper cyan coloring matter.

The method for the synthesis is explained in more detail by way of an example referring to a compound represented by the above formula (30) in which two of the rings A to D represent a pyridine ring, and the remaining two represent a benzene ring, i.e., copper dibenzobis(2,3-pyrido)porphyrazine.

Copper dibenzobis(2,3-pyrido)porphyrazine, a compound represented by the above formula (6) in which two of the rings A, B, C, and D represent a pyridine ring, and the remaining two represents a benzene ring is obtained by allowing quinolinic acid (0.5 mol), phthalic anhydride (0.5 mol), copper chloride (II) (0.25 mol), ammonium phosphomolybdate (0.004 mol) and urea (6 mol) to react at 200° C. for 5 hrs in a sulfolane solvent. The reactivity may vary depending on the type and the amount of the quinolinic acid, phthalic anhydride, metal compound, solvent, catalyst and the like employed, and not limited to the aforementioned example.

In addition, when synthesized according to the aforementioned method for the synthesis, the principal component should be copper dibenzobis(2,3-pyrido)porphyrazine, and there are five isomers represented by the formulae (31-A) to (31-E) of this compound, having different positions of the pyridine ring and positions of the nitrogen atom in the pyridine ring. At the same time, copper tribenzo(2,3-pyrido)porphyrazine represented by the formula (32) having one of the rings A to D in the above formula (30) representing a pyridine ring and the remaining three representing a benzene ring, and copper benzotris(2,3-pyrido)porphyrazine having three of the rings A to D in the above formula (30) representing a pyridine ring and the remaining one representing a benzene ring are generated as by-products. Additionally, there are also position isomers represented by the formulae (33-A) to (33-D) of these compounds with respect to the nitrogen atom in the pyridine ring, whereby a complicated mixture is formed. Moreover, copper tetrakis(2,3-pyrido)porphyrazine and copper phthalocyanine (copper tetrabenzoporphyrazine) are also generated although the amount may be small. In general, it is difficult to isolate only the intended compound from such a mixture, and copper dibenzobis(2,3-pyrido)porphyrazine in which two of the rings represent a pyridine ring, and the remaining two rings represent a benzene ring in terms of the mean value is directly used in almost all cases.

The foregoing descriptions explain in connection with the copper dibenzobis(2,3-pyrido)porphyrazine in which two of the rings A to D represent a pyridine ring, and the remaining two rings represent a benzene ring; however, also in the case of nitrogen-containing heteroaromatic rings other than pyridine, compounds in which two rings represent the nitrogen-containing heteroaromatic ring, and the remaining two rings represent a benzene ring can be obtained similarly depending on the nitrogen-containing heteroaromatic ring according to the manner to that described above. Alternatively, in the case of the compound having one or three nitrogen-containing heteroaromatic rings, or in the case of a mixture including a compound having one nitrogen-containing heteroaromatic ring with a compound having two and/or three nitrogen-containing heteroaromatic rings or the like, the intended compound can be obtained in a similar manner with changing the rate of the dicarboxylic acid derivative having a nitrogen-containing heteroaromatic ring and the phthalic acid derivative used, within the range of about 0.25 to 0.75 mol, respectively, at a proportion to give 1 mol of both derivatives, depending on the proportion of the nitrogen-containing heteroaromatic ring and the benzene ring of the intended compound.

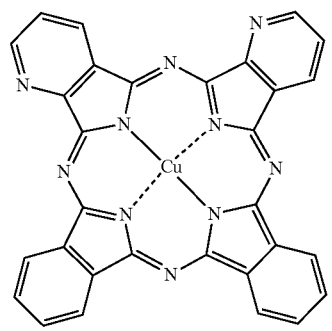

(31-A)

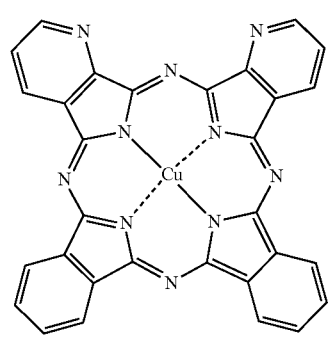

(31-B)

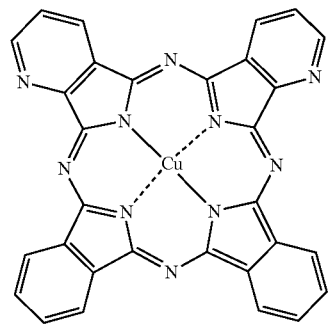

(31-C)

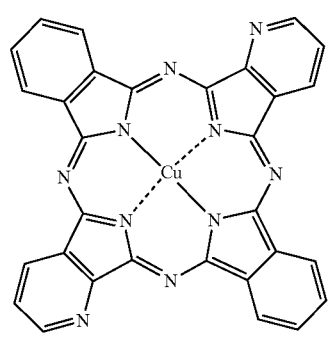

(31-D)

(31-E)

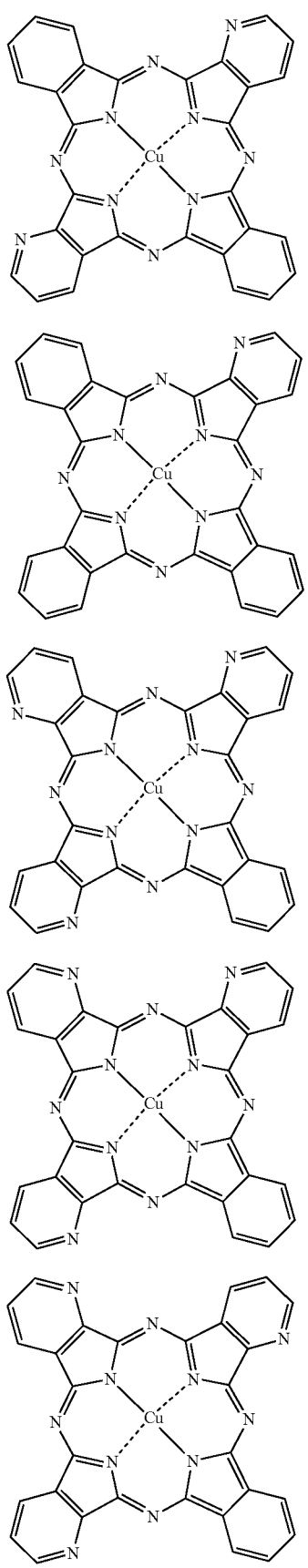

(32)

(33-A)

(33-B)

(33-C)

(33-D)

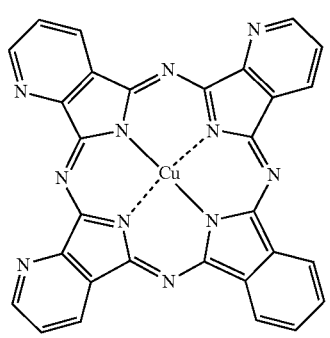

Next, the copper chlorosulfonylporphyrazine compound represented by the above formula (8) is obtained by allowing a copper cyan dye represented by the above formula (30) to be chlorosulfonylated in chlorosulfonic acid, or by sulfonating the copper porphyrazine compound represented by the above formula (30) in sulfuric acid or fuming sulfuric acid, followed by converting the sulfo group into a chlorosulfonyl group with a chlorinating agent. Thus resulting chlorosulfonyl group or sulfo group is introduced into the benzene ring as the rings A to D of the above formula (30), but not introduced when the rings A to D represent a heteroaromatic ring. Since one such group is usually introduced into the benzene ring, the number of the group introduced is no greater than the number of the benzene ring. Therefore, the number q of the chlorosulfonyl groups in the above formula (8) corresponding to the group is 1 to 3 in terms of the mean value, depending on the number of the benzene ring of the compound represented by the above formula (8).

In other method for synthesizing the copper chlorosulfonylporphyrazine compound represented by the above formula (8), sulfophthalic acid having a sulfo group is subjected to ring-closing condensation with a dicarboxylic acid derivative having a nitrogen-containing heteroaromatic ring such as quinolinic acid beforehand according to the aforementioned method to synthesize a compound having a sulfo group represented by the following formula (34), and thereafter the sulfo group is converted into a chlorosulfonyl group, whereby the intended compound represented by the formula (8) can also be obtained.

The number "q" of the chlorosulfo group in thus obtained compound represented by the above formula (8) is 1 to 3 in terms of the mean value as described above, and is preferably 2 to 3.

(34)

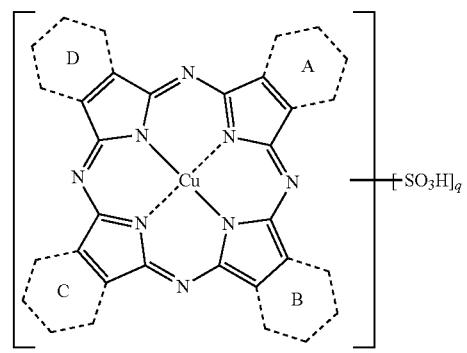

In the formula (34), the rings A to D, and q are defined similarly to those in the above formula (8).

Under the conditions for the chlorosulfonylation reaction of the copper cyan coloring matter, chlorosulfonic acid is usually used as a solvent, and the amount of the solvent used is 3 to 20 times by mass, and preferably 5 to 10 times by mass relative to the cyan coloring matter. The reaction temperature is usually 100 to 150° C., and preferably 120 to 150° C. The reaction time may vary depending on the reaction conditions such as the reaction temperature, it is usually 1 to 10 hrs. In this case, since a chlorosulfonyl group and a sulfo group will be incorporated admixed as the substituents of generally obtained copper porphyrazine compound, the reaction is preferably carried out after further adding a chlorinating agent other than chlorosulfonic acid, such as thionyl chloride, to the reaction liquid with the chlorosulfonic acid such that all the sulfo groups are chlorosulfonylated.

The amount of the added chlorinating agent other than chlorosulfonic acid is 0.5 to 10 equivalent, and preferably about 0.5 to 5 equivalent relative to the sulfo group in the sulfo substituted copper porphyrazine compound.

As the chlorinating agent, chlorosulfonic acid which may be further added, or thionyl chloride, sulfuryl chloride, phosphorus trichloride, phosphorus pentachloride, phosphorous oxychloride and the like may be exemplified, but not limited thereto. As the solvent used in the chlorinating reaction, sulfuric acid, fuming sulfuric acid, chlorosulfonic acid, benzene, toluene, nitrobenzene, chlorobenzene, N,N-dimethylformamide, N,N-dimethylacetamide and the like may be exemplified, but not limited thereto.

Next, the intended compound represented by the formula (7) is obtained by allowing the copper chlorosulfonylporphyrazine compound obtained as described above to react with an organic amine represented by the following formula (9) in the presence of ammonia or a source of ammonia generation in a water-containing solvent at a pH of about 8 to 10, at 5 to 70° C. for 1 to 20 hrs. The term "ammonia" herein means gaseous, liquid, or solid ammonia. Furthermore, the term "source of ammonia generation" means a compound that generates ammonia due to heat, neutralization or the like; and a compound or a solution containing ammonia or a compound that generates ammonia. Specific examples include ammonium salts that generate ammonia due to neutralization or the like such as ammonium chloride and ammonium sulfate; compounds that generate ammonia due to heat such as urea; and solutions such as aqueous ammonia and ammonia-containing (C1-C4)alkanols. Preferably, a solution containing ammonia, in particular, aqueous ammonia etc., provided as an aqueous solution is preferably exemplified, but not limited thereto. The ammonia or the source of ammonia generation may be used alone as a single compound, or may be used in combination. In addition, since the reaction for obtaining the compound represented by the above formula (7) is usually carried out in water or in a water-containing solvent, a compound soluble in water, i.e., a water soluble compound, aqueous ammonia or the like is more preferably used. When an ammonia solution, particularly an aqueous solution is used for the purpose of suppression of hydrolysis of the aforementioned chlorosulfonyl group, and the like, the content of ammonia contained is desirably as high as possible in the range not to compromise the handling. Thus, a commercially available product, 28% aqueous ammonia, may be used neat.

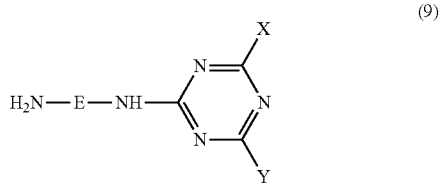

(9)

In the formula (9), E, X, and Y are defined similarly to those described above.

The amount of the organic amine represented by the above formula (9) used is usually no less than 1 time by mol of the theoretical value (number of mole required for providing the value c in the above formula (7) of 0.1 to 3) relative to 1 mol of the copper chlorosulfonylporphyrazine compound, but may vary depending on the reactivity of the organic amine, and reaction conditions. Accordingly, the amount of the organic amine is not limited thereto.

In general, the amount is 1 to 3 times by mol, and preferably about 1 to 2 times by mol of the aforementioned theoretical value.

A method for producing the organic amine represented by the above formula (9) is explained. The organic amine represented by the formula (9) can be produced according to a well-known method.

For example, an aniline or a naphthylamine that corresponds to X in an amount of 0.95 to 1.1 mol is allowed to react with 1 mol of 2,4,6-trichloro-S-triazine (cyanuric chloride) under conditions at a pH of 3 to 7, at 5 to 40° C. for 2 to 12 hrs in water to obtain a primary condensate.

Next, when Y represents an amino group, 1 mol of thus resulting primary condensate is allowed to react with 0.95 to 2.0 mol of ammonia under conditions at a pH of 4 to 10, at 5 to 80° C. for 0.5 to 12 hrs to obtain a secondary condensate.

Alternatively, when Y represents a hydroxy group, the secondary condensate is obtained by adding a hydroxide of an alkali metal such as sodium hydroxide to the reaction mixture of the primary condensate, and allowing for the reaction under conditions at a pH of 4 to 10, at 5 to 80° C. for 0.5 to 12 hrs.

Moreover, when Y represents an alkylamine or a dialkylamine, the secondary condensate is obtained by allowing 1 mol of the resulting primary condensate to react with 0.95 to 1.1 mol of the amine under conditions at a pH of 4 to 10, at 5 to 80° C. for 0.5 to 12 hrs.

Next, the compound represented by the above formula (9) is obtained by allowing 1 mol of the resulting secondary condensate to react with 1 to 50 mol of the alkylenediamine that corresponds to E under conditions at a pH of 9 to 12, at 5 to 90° C. for 0.5 to 8 hrs. For adjusting the pH in condensation, a hydroxide of an alkali metal such as sodium hydroxide or potassium hydroxide, a carbonate of an alkali metal such as sodium carbonate or potassium carbonate, or the like is usually used. It should be noted that the order of the condensation is determined appropriately depending on the reactivity of various compounds, and not limited to the foregoing.

Moreover, the cyan dye represented by the above formula (7) is synthesized from the compound represented by the above formula (8) and the organic amine represented by the above formula (9) in the presence of a source of ammonia generation under reaction conditions not particularly necessitating an anhydrous condition. Thus, it is theoretically considered that a compound is generated as a by-product in which the chlorosulfonyl group in the formula (8) is hydrolyzed in part by water contaminated in the reaction system to be converted into a sulfo group, and as a result, the by-product is contaminated in the intended dye represented by the formula (7).

However, to distinguish an unsubstituted sulfamoyl group with a sulfonic acid group by mass spectrometry is difficult. Therefore, in the present invention, the chlorosulfonyl group in the formula (8) other than those reacted with the organic amine represented by the formula (9) is described with an assumption that all such groups were converted into unsubstituted sulfamoyl groups.

Moreover, in the cyan dye represented by the above formula (7), impurities of dimers (for example, Pz-L-Pz) or trimers formed from the copper porphyrazine ring (Pz) via a divalent linking group (L) may be generated as by-products, which may be contaminated in the reaction product, but do not matter significantly since they are yielded in a slight amount.

The divalent linking group represented by L may include —SO$_2$—, —SO$_2$—NH—SO$_2$—, and the like. In the case of trimers, formation of by-products in which two such linking groups L are combined may be also involved.

Preferable cyan dye represented by the above formula (7) is a dye represented by the above formula (11). In the formula (11), $Z_1$ to $Z_8$ each independently represent a nitrogen atom or CH, but among four combinations of $Z_1$ and $Z_2$; $Z_3$ and $Z_4$; $Z_5$ and $Z_6$; and $Z_7$ and $Z_8$, at least one is a combination of CH and CH, any one is not a combination of nitrogen atoms, and not all the four combinations are CH and CH. Still further, E, X, Y, b, and c may be identical to those in the above formula (7), also involving preferred embodiments. According to the cyan dye represented by the above formula (11), the nitrogen-containing heteroaromatic ring for the rings A to D in the above formula (7) is a pyridine ring, and the position of substitution of the nitrogen atom in the pyridine ring is further specified. Other substituent and the like may be identical to those in the above formula (7), also involving preferred embodiments as described above.

Preferable compound represented by the above formula (8) is a compound represented by the above formula (12). In the formula (12), $Z_1$ to $Z_8$ are defined similarly to those in the above formula (11), and p is a number of from 1 to 3. According to the compound represented by the formula (12), the nitrogen-containing heteroaromatic ring for the rings A to D in the above formula (8) is a pyridine ring, and the position of substitution of the nitrogen atom in the pyridine ring is further specified. Others may be identical to those in the above formula (8), also involving preferred embodiments.

In the ink set of the present invention, the magenta ink composition is characterized by containing a magenta dye represented by the above formula (6).

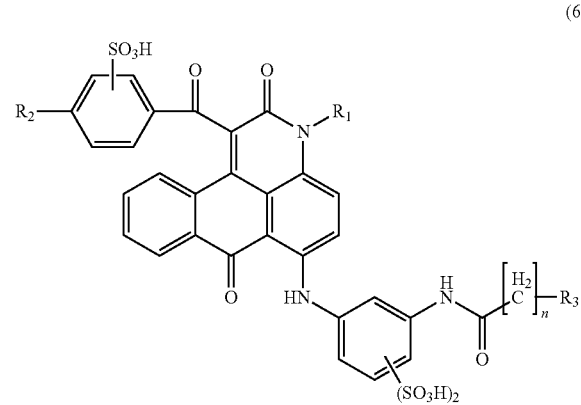

(6)

In the above formula (6), $R_1$ represents a hydrogen atom; an alkyl group; a hydroxy lower alkyl group; a cyclohexyl group; a mono- or dialkylaminoalkyl group; or a cyano lower alkyl group.

The alkyl group in $R_1$ has usually 1-6 carbon atoms (C1-C6), and preferably 1-4 carbon atoms (C1-C4), which may be either straight or branched, but is preferably straight. Specific examples of the alkyl in $R_1$ include straight alkyl such as methyl, ethyl, n-propyl, n-butyl, n-pentyl and n-hexyl; and branched alkyl such as isopropyl, isobutyl, t-butyl, isoamyl, 2-methylbutyl and isohexyl.

The hydroxy lower alkyl group in $R_1$ is exemplified by usually C1-C6, and preferably C1-C4 straight or branched alkyl group substituted with a hydroxy group, and is more preferably a straight group. Specific examples of the hydroxy lower alkyl include hydroxyethyl, hydroxypropyl, and the like. The monoalkylaminoalkyl group may include, for example, mono (C1-C4)alkylamino(C1-C4)alkyl groups such as methylaminopropyl and ethylaminopropyl. The dialkylaminoalkyl group may include, for example, di(C1-C4)alkylamino(C1-C4)alkyl group such as dimethylaminopropyl and diethylaminoethyl.

The cyano lower alkyl group may include, for example, cyano ethyl, cyano propyl and the like, and the "lower alkyl group" moiety may be identical to the lower alkyl group moiety of the hydroxy lower alkyl group in the aforementioned $R_1$ except that a cyano group is substituted in place of the hydroxy group, also involving preferred embodiments, and the like.

Among those described above, $R_1$ is preferably a hydrogen atom or an alkyl group, more preferably a hydrogen atom or a straight C1-C4 alkyl group, still more preferably a straight C1-C4 alkyl group, and particularly preferably a methyl group.

In the above formula (6), $R_2$ represents a hydrogen atom or a methoxy group. Both of these options are preferred, but a hydrogen atom is more preferred.

When $R_3$ in the above formula (6) is anilino group substituted with a group selected from the group consisting of a sulfo group, a carboxy group, an alkoxy group, a carbamoyl group, a cyano group, an alkyl group, an anilino group, a phenoxy group, an amino group, a hydroxy group and a mercapto group, the number of the substituent is usually 1 to 4, preferably 1 to 3, and more preferably 1 or 2.

Specific examples of the substituted anilino include sulfo-substituted anilino such as 2-sulfoanilino, 3-sulfoanilino, 4-sulfoanilino, and 2,5-disulfoanilino; carboxy-substituted anilino such as 2-carboxyanilino, 4-carboxyanilino, and 3,5-dicarboxyanilino; alkoxy-substituted anilino such as 4-methoxyanilino; alkyl-substituted anilino such as 4-butylanilino; anilino and sulfo-substituted anilino such as 4-anilino-3-sulfoanilino; phenoxy-substituted anilino such as 4-phenoxy anilino; amino-substituted anilino such as 4-aminoanilino; and the like.

As the anilino group, sulfo-substituted, carboxy-substituted, or unsubstituted anilino is preferred.

In $R_3$, in the case of a mono- or dialkylamino group substituted with a group selected from the group consisting of a sulfo group, a carboxy group, an alkoxy group, a carbonyl group, a carbamoyl group, a cyano group, an anilino group, a phenoxy group, an amino group, a hydroxy group, a mercapto group, and a phenyl group, or in the case of an unsubstituted mono- or dialkylamino group, the alkyl moiety is usually C1-C10 alkyl, preferably C1-C8 alkyl, more preferably C3-C8 alkyl, and still more preferably C5 alkyl.

Although the number of the substituent is not limited, it is usually 1 to 4, preferably 1 to 3, more preferably 1 or 2, and still more preferably 1.

In the case of a dialkylamino group, the alkyl moiety is preferably C1-C6 alkyl, and more preferably C1-C4 alkyl.

Specific examples of the monoalkylamino group include unsubstituted straight monoalkylamino such as methylamino, ethylamino, propylamino, butylamino, pentylamino, hexylamino, heptylamino, octylamino, nonylamino, and decylamino; unsubstituted branched monoalkylamino such as 2-ethylhexylamino; unsubstituted cyclic monoalkylamino such as cyclohexylamino; sulfo-substituted monoalkylamino such as 2-sulfoethylamino; carboxy-substituted monoalkylamino such as carboxymethylamino, 2-carboxyethylamino, 1,2-dicarboxyethylamino, 1,3-dicarboxypropylamino, and 5-carboxypentylamino; alkoxy-substituted monoalkylamino such as 3-ethoxypropylamino; carbonyl-substituted monoalkylamino such as 3-oxobutylamino; carbamoyl-substituted monoalkylamino such as 2-aminocarbonyl ethylamino; cyano-substituted monoalkylamino such as 3-cyanopropylamino; anilino-substituted monoalkylamino such as 2-phenylaminoethylamino; phenoxy-substituted monoalkylamino such as 2-phenoxy ethylamino; amino-substituted monoalkylamino such as N-(3-hydroxypropyl)aminoethylamino; hydroxy group-substituted monoalkylamino such as 2-hydroxyethylamino; mercapto group-substituted monoalkylamino such as 2-thioethylamino; phenyl-substituted monoalkylamino such as benzylamino; and the like.

The monoalkylamino group is preferably sulfo-substituted, carboxy-substituted, phenyl-substituted, or unsubstituted, and more preferably carboxy-substituted.

In the case of the dialkylamino group, specific examples thereof may be substituted with, for example, a group independently selected from the groups described above, and preferably unsubstituted dialkylamino such as dimethylamino, diethylamino, dipropylamino and dibutylamino; carboxy-substituted dialkylamino such as bis(carboxymethyl) amino; hydroxy-substituted dialkylamino such as bis(2-hydroxyethyl)amino; and the like. Unsubstituted or carboxy-substituted dialkylamino is more preferred. In addition, the dialkylamino may be either straight or branched.

In $R_3$, in the case of a phenylthio group substituted with a group selected from the group consisting of a sulfo group, a carboxy group, an alkoxy group, a carbonyl group, a carbamoyl group, a cyano group, an alkyl group, an anilino group, a phenoxy group, an amino group, a hydroxy group and a mercapto group, specific examples thereof include sulfo-substituted phenylthio such as 4-sulfophenylthio; carboxy-substituted phenylthio such as 4-carboxyphenylthio, and 3,5-dicarboxyphenylthio; alkoxy-substituted phenylthio such as 3-ethoxyphenylthio; carbonyl-substituted phenylthio such as acetyl phenylthio; carbamoyl-substituted phenylthio such as 3-aminocarbonyl phenylthio; cyano-substituted phenylthio such as 3-cyanophenylthio; alkyl-substituted phenylthio such as 4-ethylphenylthio; anilino-substituted phenylthio such as 3-phenylaminophenylthio; phenoxy- or carboxy-substituted phenoxy-substituted phenylthio such as 4-phenoxyphenylthio, and 4-(4-carboxyphenoxy)phenylthio; amino-substituted phenylthio such as 3-aminophenylthio; hydroxy group-substituted phenylthio such as 4-hydroxyphenylthio; mercapto group-substituted phenylthio such as 4-mercaptophenylthio; phenylthio in which one of hydrogen atoms of the amino group that is a substituent of the phenylthio group is substituted with an acyl group such as 4-acetylaminophenylthio; and the like. Carboxy-substituted phenylthio is preferred.

In $R_3$, in the case of an alkylthio group substituted with a group selected from the group consisting of a sulfo group, a carboxy group, an alkoxy group, a carbonyl group, a carbamoyl group, a cyano group, an anilino group, a phenoxy group, an amino group, a hydroxy group, a mercapto group and a phenyl group, or an unsubstituted alkylthio group, the alkyl moiety is preferably a C1-C10 alkyl group.

Although the number of the substituent is not limited, it is usually 1 to 4, preferably 1 to 3, more preferably 1 or 2, and still more preferably 1.

Specific examples thereof include straight alkylthio such as methylthio, ethylthio, propylthio, butylthio, pentylthio, hexylthio, heptylthio, octylthio, nonylthio, and decylthio; branched alkylthio such as 2-methylbutylthio, and 2-ethylhexylthio; cyclic alkylthio such as cyclohexylthio; sulfo-substituted alkylthio such as 2-sulfoethylthio; carboxy-substituted alkylthio such as 2-carboxyethylthio, 1,2-dicarboxyethylthio, and 1,3-dicarboxypropylthio; alkoxy-substituted alkylthio such as 2-methoxyethylthio; carbonyl-substituted alkylthio such as 3-oxobutylthio; carbamoyl-substituted alkylthio such as 2-aminocarbonylethylthio; cyano-substituted alkylthio such as 5-cyanopentylthio; anilino-substituted alkylthio such as 2-phenylaminoethylthio; phenoxy- or carboxy-substituted phenoxy-substituted alkylthio such as 4-phenoxyphenylthio, and 4-(4-carboxyphenoxy)phenylthio; alkylthio in which one of hydrogen atoms of the amino group that is a substituent of the alkylthio group is substituted with an alkyl group, such as N-methylamino ethylthio; hydroxy-substituted alkylthio such as 2-hydroxyethylthio; mercapto group-substituted alkylthio such as 4-mercaptobutylthio; phenyl-substituted alkylthio such as 2-phenylethylthio; and the like.

The alkylthio group is preferably carboxy-substituted, amino-substituted, or unsubstituted alkylthio. When it has a substituent, the alkyl moiety is preferably C1-C3 alkyl, whereas the alkyl moiety is more preferably C6-C10 when unsubstituted.

In $R_3$, in the case of a sulfoanilino group substituted with a methyl group, a methoxy group or a carboxy group, the number of the substituent is preferably 1 or 2, and more preferably 1. Specific examples thereof include methyl-substituted sulfoanilino such as 4-methyl-2-sulfoanilino, and 2-methyl-4-sulfoanilino; methoxy-substituted sulfoanilino such as 4-methoxy-2-sulfoanilino; carboxy-substituted sulfoanilino such as 2-carboxy-5-sulfoanilino, and 2-carboxy-4-sulfoanilino.

In $R_3$, in the case of a carboxy-substituted hydroxyanilino group, the number of the substituent is preferably 1 or 2, and more preferably 1.

Specific examples thereof include 3-carboxy-4-hydroxyanilino, and the like.

In $R_3$, in the case of a sulfo group-substituted naphthylamino group, the number of the substitution with the sulfo group is not particularly limited, but the number of the substitution is usually 1 to 5, preferably 1 to 4, and more preferably 1 to 3.

Specific examples thereof include naphthylamino substituted with one sulfo group such as 1-naphthylamino, 4-sulfo-1-naphthylamino, 5-sulfo-1-naphthylamino, 5-sulfo-2-naphthylamino, 6-sulfo-1-naphthylamino, and 7-sulfo-1-naphthylamino; naphthylamino substituted with two sulfo groups such as 4,8-disulfo-2-naphthylamino, 3,8-disulfo-1-naphthylamino, and 3,6-disulfo-1-naphthylamino; naphthylamino substituted with three sulfo groups such as 3,6,8-trisulfo-2-naphthylamino, 4,6,8-trisulfo-2-naphthylamino, and 3,6,8-trisulfo1-naphthylamino; and the like.

In $R_3$, in the case of a phenoxy group substituted with a group selected from the group consisting of a sulfo group, a carboxy group, an acetylamino group, an amino group, a hydroxy group, a phenoxy group and a phenyl group, the number of the substituent is usually 1 to 3, and preferably 1 or 2.

Specific examples thereof include sulfo-substituted phenoxy such as 4-sulfophenoxy; carboxy-substituted phenoxy such as 4-carboxyphenoxy, and 3,5-dicarboxyphenoxy; acetylamino-substituted phenoxy such as 4-acetylaminophenoxy; amino-substituted phenoxy such as 2-aminophenoxy; hydroxy group-substituted phenoxy such as 4-hydroxyphenoxy; phenoxy, or carboxy-substituted phenoxy-substituted phenoxy such as 4-phenoxy phenoxy, and 4-(4-carboxyphenoxy)phenoxy; phenyl-substituted phenoxy such as 4-phenylphenoxy; and the like.

In $R_3$, in the case of a monoalkylaminoalkylamino group, the alkyl has carbon atoms in the range of usually C1-C10, preferably C1-C6, and more preferably C1-C4.

Specific examples include 2-methylamino ethylamino, 3-methylamino propylamino, 3-ethylaminopropylamino, and the like. When $R_3$ is a dialkylaminoalkylamino group, it may independently have two "monoalkyl" moieties as in the aforementioned monoalkylaminoalkylamino group. The range of the alkyl is similar to that of the aforementioned monoalkylaminoalkylamino group, also involving preferred embodiments, and the like. Specific examples thereof include 3-(N,N-diethylamino)propylamino, 2-(N,N-diethylamino) ethylamino, and the like.

In $R_3$, among those exemplified in the foregoing: substituted or unsubstituted mono- or dialkylamino groups are preferred; substituted or unsubstituted monoalkylamino groups are more preferred; substituted monoalkylamino groups are still more preferred; and carboxy-substituted monoalkylamino groups are particularly preferred. A 5-carboxypentylamino group is most preferred.

In the above formula (6), n represents an integer of 1 to 3. The denotation n is more preferably 1 or 2, and still more preferably 1.

Preferable magenta dye represented by the above formula (6) is the dye represented by the above formula (10). In the dye represented by the above formula (10), the positions of substitution of three sulfo groups not specified in the above formula (6) are specified, and further $R_1$ and $R_2$ are specified to a methyl group and a hydrogen atom, respectively. With regard to n and $R_3$, these may be identical to those in the above formula (6), also involving preferred embodiments, and the like.

Specific examples of the magenta dye represented by the above formula (6) are shown in Table 2 below, but not particularly limited thereto.

TABLE 2

| Dye No. | R1 | R2 | n | R3 |
|---|---|---|---|---|
| M-1 | methyl | H | 1 | butylamino |
| M-2 | methyl | H | 1 | 5-carboxypentylamino |
| M-3 | methyl | H | 1 | 2-carboxyethylthio |
| M-4 | methyl | H | 1 | 2-carboxyphenylthio |
| M-5 | methyl | H | 1 | benzylamino |
| M-6 | methyl | H | 1 | anilino |
| M-7 | methyl | H | 1 | octylthio |
| M-8 | methyl | H | 1 | hexylamino |
| M-9 | methyl | H | 2 | 2-carboxyphenylthio |
| M-10 | methyl | H | 1 | diethylamino |
| M-11 | methyl | H | 1 | diisopropylamino |
| M-12 | methyl | H | 2 | 5-carboxypentylamino |
| M-13 | methyl | H | 2 | butylamino |

TABLE 2-continued

| Dye No. | R1 | R2 | n | R3 |
|---|---|---|---|---|
| M-14 | methyl | H | 1 | dibutylamino |
| M-15 | methyl | H | 1 | 3-carboxypropylamino |
| M-16 | methyl | H | 1 | N,N-bis(carboxymethyl)amino |
| M-17 | methyl | H | 1 | octylamino |
| M-18 | methyl | H | 1 | 2-ethylhexylamino |
| M-19 | methyl | H | 1 | 2-carboxyanilino |
| M-20 | methyl | H | 1 | dimethylaminopropylamino |
| M-21 | methyl | H | 1 | 2-aminoethylthio |
| M-22 | methyl | H | 1 | carboxymethylamino |
| M-23 | methyl | H | 2 | carboxymethylamino |
| M-24 | methyl | H | 1 | 2-sulfoethylamino |
| M-25 | methyl | H | 1 | 3-sulfoanilino |
| M-26 | methyl | H | 1 | 4-sulfoanilino |
| M-27 | methyl | H | 1 | phenoxy |
| M-28 | methyl | H | 1 | 2-aminoethylamino |
| M-29 | H | methoxy | 1 | butylamino |
| M-30 | H | methoxy | 1 | carboxymethylamino |
| M-31 | H | methoxy | 1 | 2-carboxyphenylthio |
| M-32 | H | methoxy | 1 | 2-carboxyethylthio |
| M-33 | H | H | 1 | butylamino |
| M-34 | H | H | 1 | carboxymethylamino |
| M-35 | H | H | 1 | 2-carboxyphenylthio |
| M-36 | H | H | 1 | 2-carboxyethylthio |
| M-37 | methyl | methoxy | 1 | butylamino |
| M-38 | methyl | methoxy | 1 | carboxymethylamino |
| M-39 | methyl | methoxy | 1 | 2-carboxyphenylthio |
| M-40 | methyl | methoxy | 1 | 2-carboxyethylthio |

The magenta dye represented by the above formula (6) is produced by, for example, the following method. In the following formulae (24) to (27), any one of $R_1$, $R_2$, $R_3$, and n is defined similarly to those described above. More specifically, 1 mol of an anthraquinone compound represented by the following formula (24) is allowed to react with 1.1 to 3 mol of $R_2$-substituted ethyl benzoylacetate in a polar solvent such as xylene, in the presence of a basic compound such as sodium carbonate, at 130 to 180° C. for 5 to 15 hrs reaction to obtain a compound represented by the following formula (25).

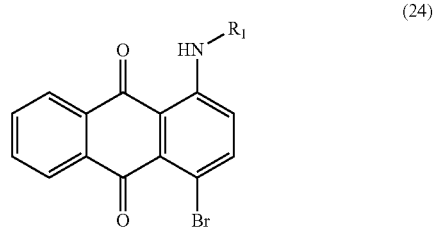

(24)

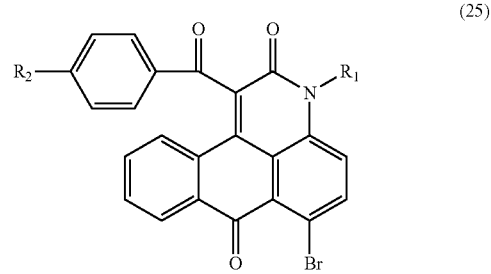

(25)

Thus resulting compound represented by the above formula (25) in an amount of 1 mol is subjected to an Ullmann reaction to execute condensation with 1 to 5 mol of meta-aminoacetanilide in an aprotic polar organic solvent such as N,N-dimethylformamide, in the presence of a base such as sodium carbonate and a copper catalyst such as copper acetate at 110 to 150° C. for 2 to 6 hrs to obtain a compound represented by the following formula (26).

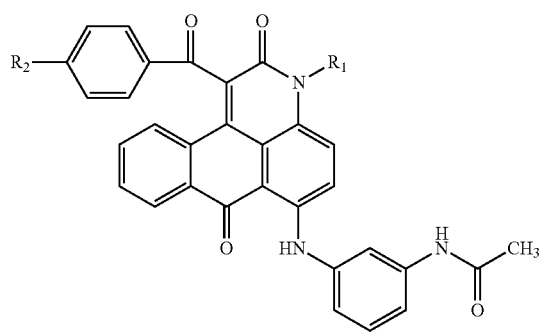
(26)

Thus resulting compound represented by the above formula (26) is sulfonated in 8 to 15% fuming sulfuric acid at 50 to 120° C., and concurrently hydrolyzing the acetylamino group to obtain a compound represented by the following formula (27).

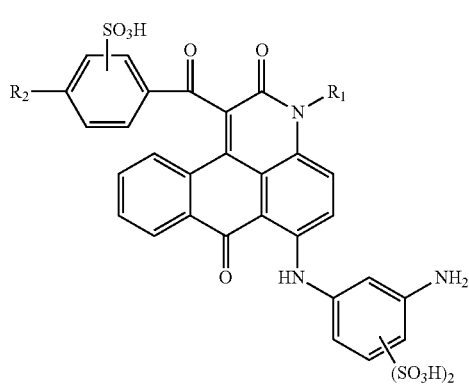
(27)

Thus resulting compound represented by the above formula (27) in an amount of 1 mol is allowed to react with, for example, a compound represented by the following formula (28) in an amount of 2 to 2.5 mol in water at a pH of 2 to 9, at 2 to 15° C. for 30 min to 1 hour to obtain a compound represented by the following formula (29). Then, the compound represented by the following formula (29) is allowed to react with a compound corresponding to $R_3$, i.e., a compound represented by "$R_3$—H" etc., in an amount of 2 to 5 mol at a pH of 7 to 10, at 20 to 90° C. for 10 min to 10 hrs to substitute the leaving group $X^1$ in the formula (29) with $R_3$, whereby the compound represented by the above formula (6) can be obtained. As the leaving group $X^1$ in the following formulae (28) and (29), a halogen atom, a sulfonyloxy group and the like may be exemplified in general, and a halogen atom such as a chlorine atom is preferred. As the compound represented by the following formula (28), chloroacetyl chloride, chloropropionyl chloride, chlorobutyryl chloride and the like may be exemplified, and these are available as a commercial product.

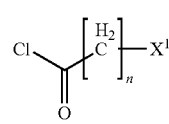
(28)

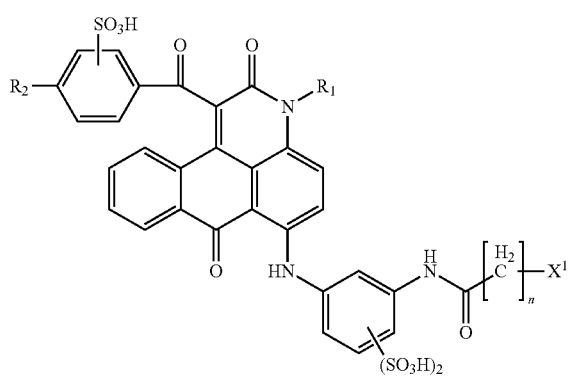
(29)

The ink set of the present invention is an ink set for ink-jet recording which is characterized by being an at least two-color ink set composed of at least two kinds of ink compositions of a cyan ink composition and a magenta ink composition, in which a cyan dye contained in the cyan ink composition is a dye represented by the above formula (7) or a salt thereof, and a magenta dye contained in the magenta ink composition is a dye represented by the above formula (6) or a salt thereof. However, for carrying out color recording, it is preferred to provide a three-color ink set by further adding a yellow ink composition. As the yellow dye contained in this yellow ink composition of the third color, any dye which has been known for ink-jet recording may be used, and a diszao yellow dye is desirably used taking into consideration that deterioration of the effects of the present invention should be prohibited. As the yellow dye which is preferred, a dye represented by the following formula (1) may be exemplified.

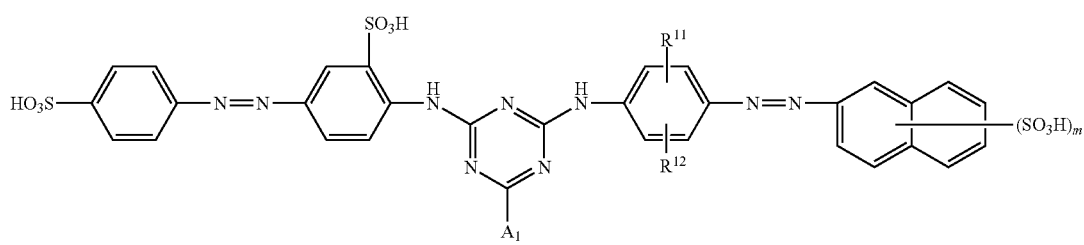
(1)

$R^{11}$ and $R^{12}$ each independently represent a hydrogen atom, a C1-C4 alkyl group, or a C1-C4 alkoxy group; m represents an integer of 1 to 3; and the group $A_1$ represents a group represented by any one of the following formulae (2) to (5).

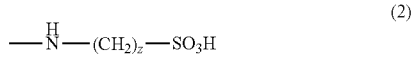
(2)

In the above formula (2), z represents an integer of 1 to 3.

(3)

In the above formula (3), y represents an integer of 1 to 11.

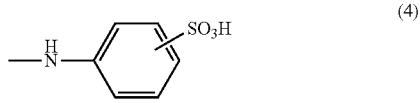
(4)

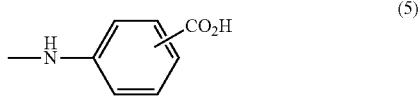
(5)

In the above formula (1), the C1-C4 alkyl group in $R^{11}$ and $R^{12}$ may be either one of straight and branched alkyl groups, but straight alkyl groups are more preferred. Specific examples of preferable alkyl group include straight alkyl groups such as methyl, ethyl, n-propyl and n-butyl; and branched alkyl groups such as isopropyl, isobutyl, 1-methylpropyl and t-butyl. More preferably, the alkyl group is a methyl group.

In $R^{11}$ and $R^{12}$, the C1-C4 alkoxy group may be either one of straight and branched alkyl groups, but straight alkoxy groups are more preferred. Specific examples of preferable alkoxy group include straight alkoxy groups such as methoxy, ethoxy, n-propoxy and n-butoxy; and branched alkoxy groups such as isopropoxy, isobutoxy, 1-methylpropoxy and t-butoxy. More preferably, the alkoxy group is a methoxy group.

As the combination of $R^{11}$ and $R^{12}$, any combinations selected from a hydrogen atom, a methyl group and a methoxy group are preferred. Those in which at least one of $R^{11}$ and $R^{12}$ is a hydrogen atom are more preferred, and dyes in which both of $R^{11}$ and $R^{12}$ are a hydrogen atom are still more preferred.

The denotation m is generally from 1 to 3, preferably 2 or 3, and more preferably 2. The position of substitution of the sulfo group, the number of substitution of which is represented by m, whose position of substitution on the naphthyl ring is not specified, is not particularly limited; however, provided that the position of substitution of the azo group is the 2-position, it is preferred that the position of substitution of the sulfo group be: the 6-position when m is 1; the 4-position and 8-position, the 5-position and 7-position, and the 6-position and 8-position when m is 2; and the 4-position, 6-position, and 8-position when m is 3; respectively.

In the above formula (1), the group $A_1$ represents a group which is represented by any one of the above formulae (2) to (5).

When the group $A_1$ is represented by the above formula (2), z in the formula (2) represents an integer of 1 to 3, and is preferably 2.

When the group $A_1$ is represented by the above formula (3), y in the formula (3) represents an integer of 1 to 11, preferably 1 to 6, more preferably 1 to 4, and still more preferably 2.

As the group $A_1$, any of groups represented by the above formula (2) to (5) is preferred, but the group $A_1$ is represented more preferably by the above formula (2) or (3), and still more preferably by the formula (2).

With respect to the aforementioned $R^{11}$, $R^{12}$, m, group $A_1$, z and y, dyes in which preferable options are combined are more preferred, and dyes in which more preferable options are combined are still more preferred. In addition, those in which still more preferable options are combined are similarly even more preferred.

Next, specific examples of preferable yellow dye for use in the ink set of the present invention are shown in Table 3 below. In Table 3, an acidic functional group such as a sulfo group and the like is shown in the form of its free acid.

TABLE 3

| Dye | | | | | | structural formula |
|---|---|---|---|---|---|---|
| No. | R11 | R12 | m | z | y | |
| Y-1 | H | H | 2 | 1 | | (structure shown) |

TABLE 3-continued
| Dye No. | R11 | R12 | m | z | y | structural formula |
|---|---|---|---|---|---|---|
| Y-2 | H | H | 2 | 2 | | 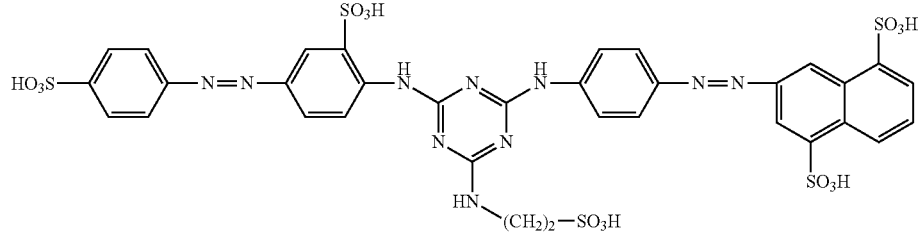 |
| Y-3 | H | H | 2 | 3 | | 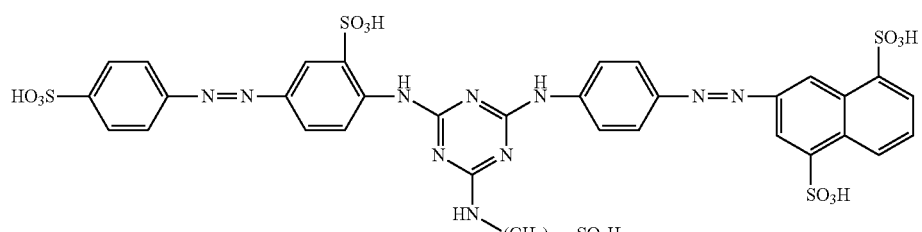 |
| Y-4 | H | H | 2 | 1 | | 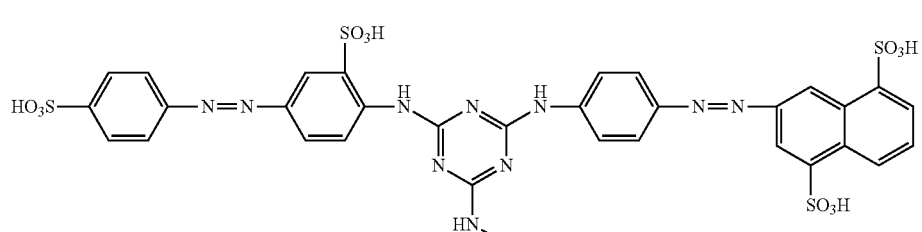 |
| Y-5 | H | H | 2 | 2 | | 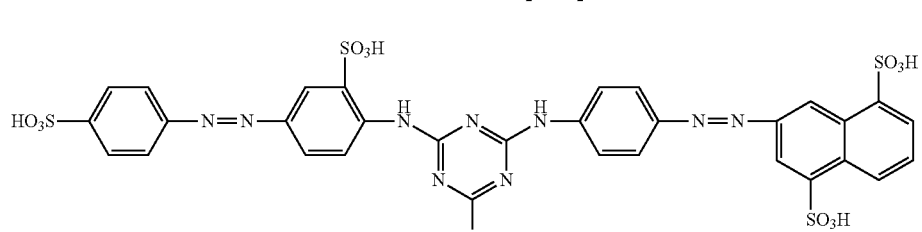 |
| Y-6 | H | H | 2 | 3 | | 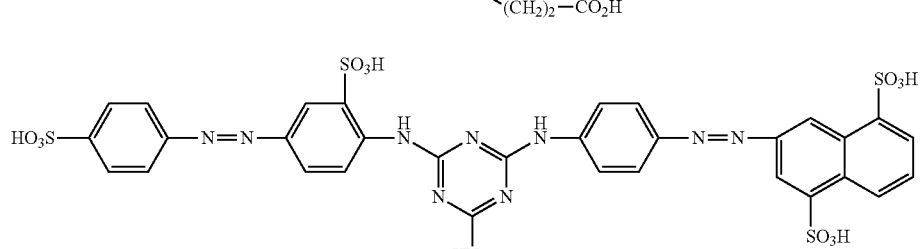 |
| Y-7 | H | H | 2 | 4 | | 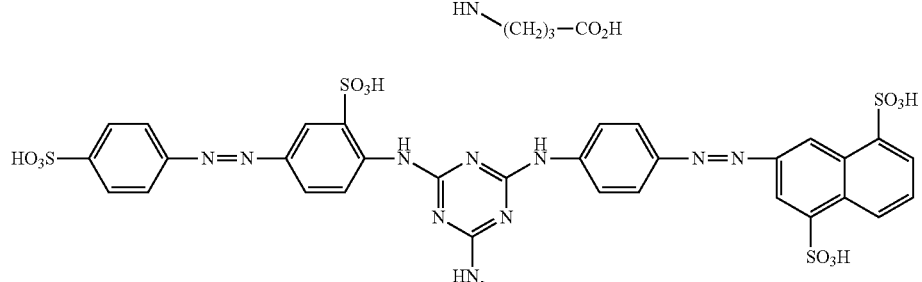 |

TABLE 3-continued

| Dye No. | R11 | R12 | m | z | y | structural formula |
|---|---|---|---|---|---|---|
| Y-8 | H | H | 2 | | 5 | (structure with $-NH-(CH_2)_5-CO_2H$ substituent on triazine) |
| Y-9 | H | H | 2 | | 6 | (structure with $-NH-(CH_2)_6-CO_2H$ substituent on triazine) |
| Y-10 | H | H | 2 | | 11 | (structure with $-NH-(CH_2)_{11}-CO_2H$ substituent on triazine) |
| Y-11 | H | H | 2 | | | (structure with $-HN-$(3-sulfophenyl) substituent on triazine) |
| Y-12 | H | H | 2 | | | (structure with $-HN-$(4-sulfophenyl) substituent on triazine) |

TABLE 3-continued
| Dye No. | R11 | R12 | m | z | y | structural formula |
|---|---|---|---|---|---|---|
| Y-13 | H | H | 2 | | | 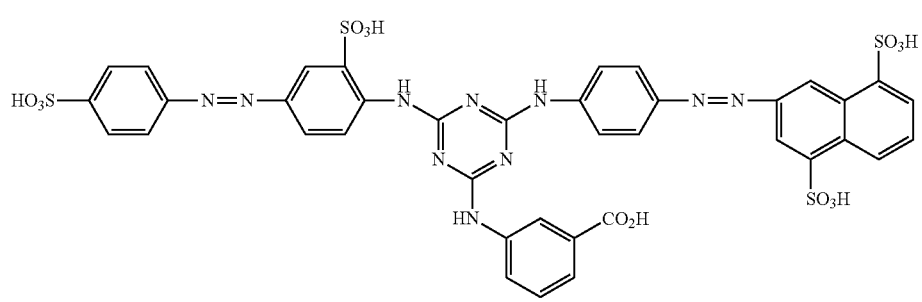 |
| Y-14 | H | H | 2 | | | 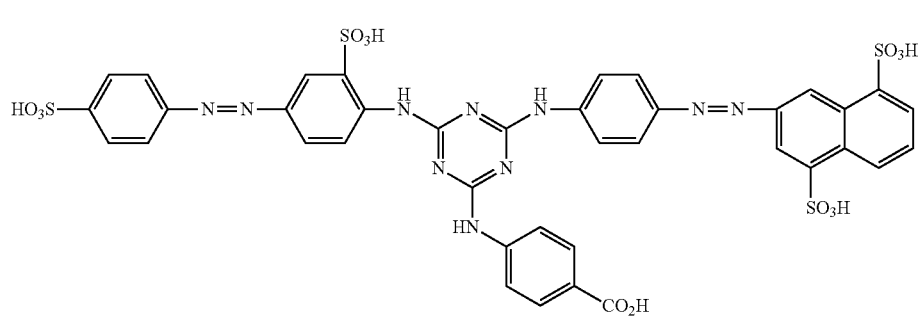 |
| Y-15 | Me | H | 2 | 2 | | 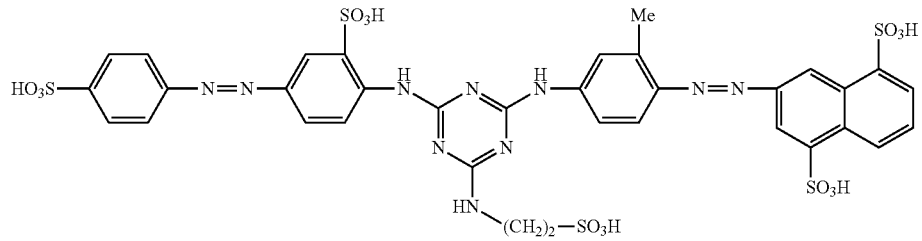 |
| Y-16 | MeO | H | 2 | 2 | | 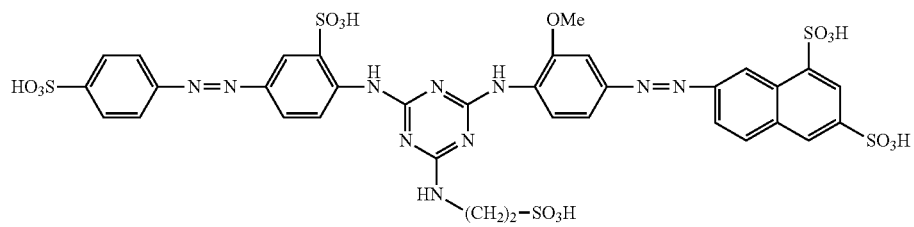 |
| Y-17 | H | H | 3 | 2 | | 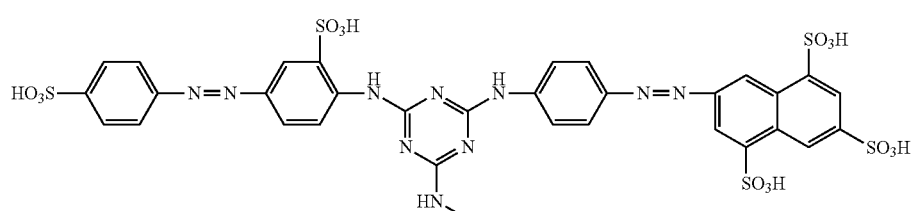 |

TABLE 3-continued

| Dye No. | R11 | R12 | m | z | y | structural formula |
|---|---|---|---|---|---|---|
| Y-18 | H | H | 2 | 2 | | 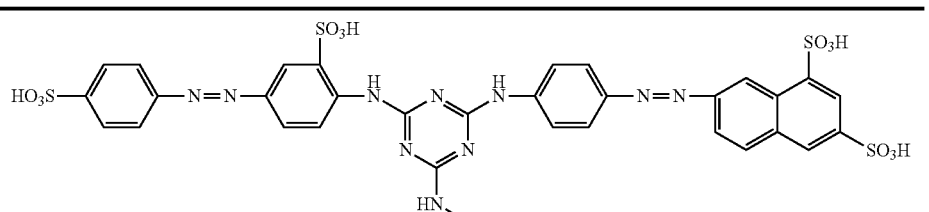 |
| Y-19 | H | H | 2 | 2 | | 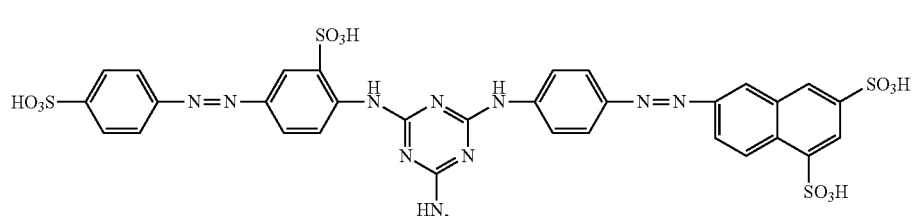 |
| Y-20 | H | | 3 | 1 | 2 | 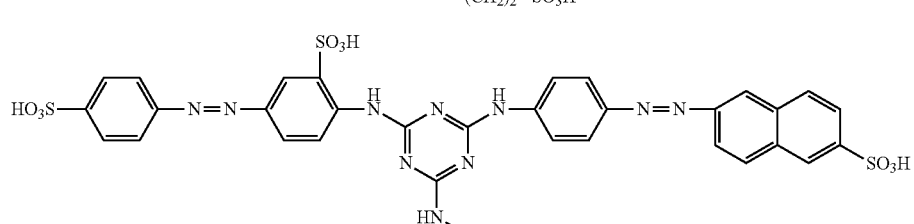 |

The yellow dye represented by the above formula (1) can be produced by, for example, as in the following. It should be noted that $R^{11}$, $R^{12}$, m, group $A_1$, z, and y appropriately used in the following formulae (13) to (23) are defined similarly to those in the above formulae (1) to (5), respectively.

With reference to examples described in Japanese Unexamined Patent Application, Publication No. 2004-75719, a compound represented by the following formula (13) is converted into a methyl-ω-sulfonic acid derivative (14) using sodium bisulfite and formalin. Next, a naphthalenesulfonic acid or aminobenzene represented by the following formula (15) is diazotized according to a conventional method, and the product is subjected to a coupling reaction with the methyl-ω-sulfonic acid derivative represented by the formula (14) obtained beforehand at a pH of 2 to 4, at 0 to 15° C. Subsequently, a hydrolysis reaction is carried out at a pH of 10.5 to 11.5, at 80 to 95° C. to obtain a compound represented by the following formula (16).

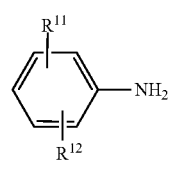

(13)

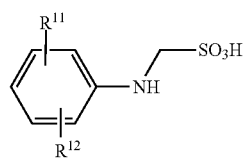

(14)

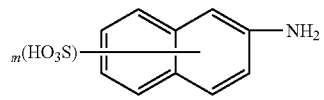

(15)

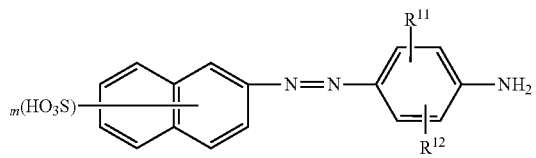

(16)

Next, 1 equivalent of an azo compound represented by the following formula (17) is subjected to condensation with cyanuric halide such as e.g., cyanuric chloride at a temperature of 0 to 20° C. under weakly acidic conditions of a pH of 5 to 7 to obtain a compound represented by the following formula (18). Subsequently, 1 equivalent of the compound represented by the formula (16) obtained in the foregoing is subjected to condensation with the compound represented by the following formula (18) at a temperature of 20 to 50° C. under weakly acidic conditions of a pH of 6 to 7 to obtain a compound represented by the following formula (19)

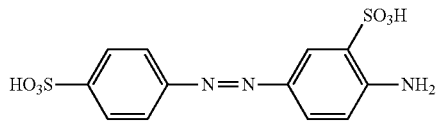 (17)

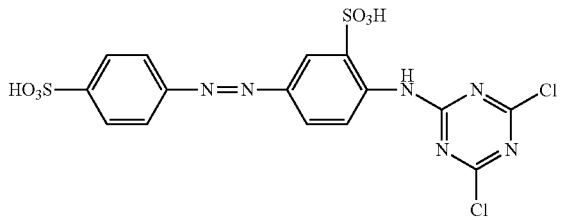 (18)

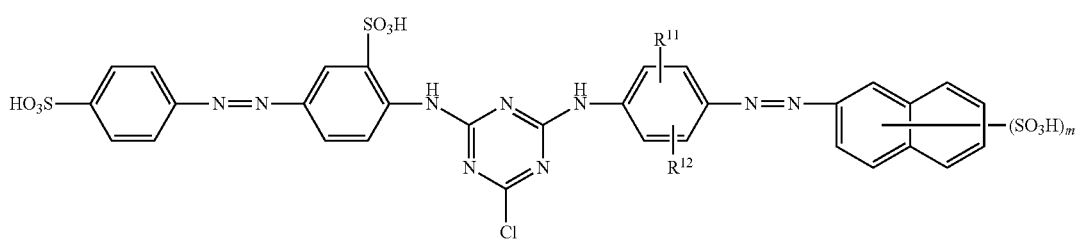 (19)

Chlorine atoms in thus resulting compound represented by the above formula (19) are substituted with a compound represented by the following formulae (20) to (23) that corresponds to the group $A_1$-H in the above formula (1) at preferably 75 to 90° C. under conditions of a pH of 7 to 9 to obtain the yellow dye represented by the above formula (1).

$$H_2N-(CH_2)_z-SO_3H \quad (20)$$

$$H_2N-(CH_2)_y-CO_2H \quad (21)$$

 (22)

 (23)

As the compound represented by the above formula (13), for example, aniline, 3-methylaniline, 2-methylaniline, 2-methoxyaniline, 3-methoxyaniline, 2,5-dimethylaniline, 2-methoxy-5-methylaniline, 2,5-dimethoxyaniline, and the like may be exemplified. As preferable specific examples, aniline, 3-methylaniline, 2-methoxyaniline and the like may be exemplified, and more preferable specific examples include aniline, and the like. Specific examples of preferable compound represented by the above formula (15) include 2-aminonaphthalene-4,8-disulfonic acid, 2-aminonaphthalene-5,7-disulfonic acid, 2-aminonaphthalene-6,8-disulfonic acid, 2-aminonaphthalene-4,6,8-trisulfonic acid, 2-aminonaphthalene-6-sulfonic acid, and the like.

In addition, as the compound represented by the above formula (20), aminomethylsulfonic acid, taurine, homotaurine and the like may be exemplified, and taurine is preferred. Specific examples of the compound represented by the above formula (21) include glycine, β-alanine, 4-aminobutyric acid, 5-aminovaleric acid, 6-aminohexanoic acid, 7-aminoheptanoic acid, 12-aminododecanoic acid, and the like.

Moreover, as the compound represented by the above formula (22), 3-aminobenzenesulfonic acid, 4-aminobenzenesulfonic acid and the like may be exemplified, and 3-aminobenzenesulfonic acid is preferred. Specific examples of the compound represented by the above formula (23) include 3-aminobenzoic acid, and 4-aminobenzoic acid.

It should be noted that the compound represented by the above formula (17) is available as a commercial product manufactured by Chemco International, Inc.

With regard to all the ink sets, ink compositions, and the dyes contained in the ink composition described above, combinations of preferable options are more preferred, and combinations of more preferable options are still more preferred. The same is applied to any combinations of still more preferable options and particularly preferable options, and the like.

Each dye used in the ink set of the present invention is present in the form of either a free acid or a salt thereof. The salt of each dye may be a salt with an inorganic or organic cation. Specific examples of the inorganic cation salt include alkali metal salts, for example, salts with lithium, sodium, potassium and the like. Furthermore, examples of the organic cation include, for example, quaternary ammonium salts represented by the following formula (35) but not limited thereto.

 (35)

In the formula (35), $Z_1$ to $Z_4$ each independently represent a hydrogen atom, a C1-C4 alkyl group, a hydroxy(C1-C4) alkyl group, or a hydroxy(C1-C4)alkoxy(C1-C4)alkyl group.

Wherein, examples of the C1-C4 alkyl group in $Z_1$ to $Z_4$ include methyl, ethyl and the like; examples of the hydroxy (C1-C4)alkyl group include hydroxymethyl, hydroxyethyl, 3-hydroxypropyl, 2-hydroxypropyl, 4-hydroxybutyl, 3-hydroxybutyl, 2-hydroxybutyl and the like; and further, examples of the hydroxy(C1-C4)alkoxy(C1-C4)alkyl group include hydroxyethoxymethyl, 2-hydroxyethoxyethyl, 3-(hydroxyethoxy)propyl, 3-(hydroxyethoxy)butyl, 2-(hydroxyethoxy)butyl and the like.

Among the aforementioned salts, preferable salts include salts of sodium, potassium, lithium, monoethanolamine, diethanolamine, triethanolamine, monoisopropanolamine, diisopropanolamine and triisopropanolamine, ammonium salts, and the like. Of these, particularly preferred are lithium, sodium, potassium, and ammonium salts.

As is apparent to persons skilled in the art, the salt of each dye used in the present invention can be readily obtained by the following method and the like.

For example, sodium chloride is added to a reaction liquid of the final step in the synthesis reaction of the dye, or to an aqueous solution dissolving wet cake containing the dye or a dried matter containing the dye, or the like, whereby salting-out is executed, followed by filtration of the precipitated solid. Accordingly a sodium salt of the dye can be obtained as a wet cake.

In addition, after dissolving the wet cake of the resulting sodium salt in water, an acid such as hydrochloric acid is added to adjust the pH appropriately, followed by filtration of the precipitated solid. Thus resulting solid is washed with water or acidic water such as aqueous hydrochloric acid, or the like, thereby enabling inorganic salts such as for example, sodium chloride, sodium sulfate etc., contained as impurities to be removed. Accordingly, a free acid of the dye can be obtained, or a mixture of a free acid and a sodium salt in which a part of the dye is a sodium salt can be obtained alternatively.

Additionally, when for example, an inorganic base such as potassium hydroxide, lithium hydroxide or aqueous ammonia, or an organic base such as a hydroxide of the compound represented by the above formula (35) is added while a wet cake of the free acid of the dye is stirred with water to make the solution alkaline, each corresponding potassium salt, lithium salt, ammonium salt, or quaternary ammonium salt can be obtained. By limiting the number of mole of the aforementioned salt added with respect to the number of mole of the free acid, preparation of for example, mixed salts etc., of lithium and sodium, as well as mixed salts etc., of lithium, sodium, and ammonium is also enabled.

As the inorganic base, the aforementioned hydroxide of an alkali metal such as lithium hydroxide, sodium hydroxide or potassium hydroxide, as well as a carbonate of an alkali metal such as lithium carbonate, sodium carbonate or potassium carbonate, and ammonium hydroxide (aqueous ammonia), etc., may be used.

Examples of the organic base which may be used include quaternary ammonium salts represented by the above formula (35) such as for example, alkanolamines such as diethanolamine and triethanolamine, but not limited thereto.

The salt of the dye may have varying physical properties such as solubility, or performance of the ink when used as an ink, depending on the type of the salt. Therefore, selection of the type of the salt is preferably carried out to meet intended ink performance and the like.

The salts of the dyes used in the ink set may not necessarily be the same, and for example, the ink set including sodium salts of the dyes for use in the yellow ink and the cyan ink, and an ammonium salt of the dye for use in the magenta ink is also acceptable.

The reaction liquid, etc., of the final step in the synthesis reaction of each dye can also be directly used for producing the ink composition for use in the ink set of the present invention. However, after isolating the dye from the reaction liquid by, for example, crystallization, spray drying or the like, followed by drying as needed, the resulting dye can be used to prepare an ink composition.

The ink composition for use in the ink set of the present invention contains each dye in an amount of usually 0.1 to 20% by mass, and more preferably 1 to 10% by mass in the total mass of the ink composition. The amount of the dye preferably contained in the ink composition of each color may vary, and it is respectively preferred that the cyan ink composition contains the cyan dye in an amount of 2.0 to 6.0% by mass; the magenta ink composition contains the magenta dye in an amount of 2.0 to 8.0% by mass; and the yellow ink composition contains the yellow dye in an amount of 1.0 to 5.0% by mass.

The ink compositions that compose the ink set of the present invention are prepared by dissolving each dye in water, and if necessary an aqueous medium to which a water soluble organic solvent (organic solvent that is miscible with water) or the like was added, and further adding thereto an ink adjusting agent as needed. In order to use this ink composition as an ink for ink jet printer, the content of inorganic impurities such as metal cation chlorides (for example, sodium chloride) and sulfuric acid salts (for example, sodium sulfate) contained as impurities is preferably as low as possible. In this regard, the total content of, for example, sodium chloride and sodium sulfate accounts for about no greater than 1% by mass in total mass of each dye. For the production of the compound including less inorganic impurities, for example, a desalination treatment may be carried out with a method with a reverse osmotic membrane well known per se. The desalination treatment can be also executed by other method in which a dried matter or wet cake of each dye or a salt thereof is stirred in a mixed solvent of an alcohol such as methanol and water to give a suspension, and the solid is collected by filtration followed by drying.

The ink composition for use in the ink set of the present invention is prepared with water as a medium, and may contain a water soluble organic solvent as needed in the range not to deteriorate the effects of the present invention. The water soluble organic solvent may have a function similar to a dye solubilizer, a drying-preventive agent (wetting agent), a viscosity adjusting agent, a permeation accelerating agent, a surface tension adjusting agent, a defoaming agent and the like, and it is preferred that the water soluble organic solvent is contained in the ink composition. The other ink preparation agent includes well-known additives such as for example, a preservative and fungicide, a pH adjusting agent, a chelating reagent, a rust-preventive agent, an ultraviolet ray absorbing agent, a viscosity adjusting agent, a dye solubilizer, a discoloration-preventive agent, an emulsification stabilizer, a surface tension adjusting agent, a defoaming agent, a dispersant, and a dispersion stabilizer. The content of the water soluble organic solvent is 0 to 60% by mass, and preferably 10 to 50% by mass of the entire ink, whereas the ink preparation agent may be used in an amount of 0 to 20% by mass, and preferably 0 to 15% by mass of the entire ink. The remaining component is water.

The water soluble organic solvent usable in the present invention may be, for example: a (C1-C4)alkanol such as methanol, ethanol, n-propanol, isopropanol, n-butanol, isobutanol, secondary butanol or tertiary butanol; an amide such as N,N-dimethylformamide or N,N-dimethylacetamide; a heterocyclic ketone such as 2-pyrrolidone, N-methyl-2-pyrrolidone, 1,3-dimethylimidazolidin-2-one or 1,3-dimethylhexahydropyrimid-2-one; a ketone or a keto alcohol such as acetone, methylethylketone or 2-methyl-2-hydroxypentan-4-one; a cyclic ether such as tetrahydrofuran or dioxane; a mono, oligo, or polyalkylene glycol or thioglycol having a (C2-C6)alkylene unit such as ethylene glycol, 1,2- or 1,3-propylene glycol, 1,2- or 1,4-butylene glycol, 1,6-hexylene glycol, diethylene glycol, triethylene glycol, tetraethylene glycol, dipropylene glycol, polyethylene glycol, polypropylene glycol or thiodiglycol; a polyol (triol) such as glycerin or hexane-1,2,6-triol; a (C1-C4)monoalkyl ether of a polyhydric alcohol such as ethylene glycol monomethyl ether, ethylene glycol monoethyl ether, diethylene glycol monomethyl ether, diethylene glycol monoethyl ether, diethylene glycol monobutyl ether (butylcarbitol), triethylene glycol monomethyl ether or triethylene glycol monoethyl ether; γ-butyrolactone, dimethyl sulfoxide, or the like.

As the water soluble organic solvent, preferable examples include isopropanol, glycerin, mono-, di-, or tri-ethylene glycol, dipropylene glycol, 2-pyrrolidone, N-methyl-2-pyrrolidone, and butylcarbitol, whereas more preferable examples include isopropanol, glycerin, diethylene glycol, 2-pyrrolidone, N-methyl-2-pyrrolidone, and butylcarbitol. These water soluble organic solvents are used either alone or as a mixture.

The preservative and fungicide may include, for example, a compound of organic sulfur based, organic nitrogen sulfur based, organic halogen based, haloallyl sulfone based, iodopropargyl based, N-haloalkylthio based, benzothiazole based, nitrile based, pyridine based, 8-oxyquinoline based, isothiazoline based, dithiol based, pyridineoxide based, nitropropane based, organic tin based, phenol based, quaternary ammonium salt based, triazine based, thiadiazine based, anilide based, adamantane based, dithiocarbamate based, brominated indanone based, benzylbromoacetate based compound, or the like.

The organic halogen based compound may include, for example, sodium pentachlorophenol; the pyridineoxide based compound may include, for example, sodium 2-pyridinethiol-1-oxide; and the isothiazoline based compound may include, for example, 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesiumchloride, 5-chloro-2-methyl-4-isothiazolin-3-one calciumchloride, 2-methyl-4-isothiazolin-3-one calciumchloride, and the like.

The other preservative and fungicide may be exemplified by sodium acetate, sodium sorbate, sodium benzoate, and the like. Other specific examples of preferable preservative and fungicide include e.g., trade names Proxel GXL (S), Proxel XL-2 (S) manufactured by Avecia Limited, and the like.

The pH adjusting agent may be used for the purpose of improving storage stability of the ink, and an arbitrary substance can be used as long as the pH of the ink can be controlled to fall within the range of 6.0 to 11.0. Examples of the pH adjusting agent include alkanolamines such as diethanolamine and triethanolamine, hydroxides of an alkali metal such as lithium hydroxide, sodium hydroxide and potassium hydroxide, ammonium hydroxide as well as carbonates of an alkali metal such as lithium carbonate, sodium carbonate and potassium carbonate, and the like.

The chelating agent may include, for example, sodium ethylenediamine tetraacetate, sodium nitrilo triacetate, sodium hydroxyethylethylenediamine triacetate, sodium diethylenetriamine pentaacetate, sodium uracil diacetate, and the like.

The rust-preventive agent may include, for example, acidic sulfite, sodium thiosulfate, ammonium thioglycolate, diisopropylammonium nitrite, pentaerythritol tetranitrate, dicyclohexylammonium nitrite, and the like.

Examples of the ultraviolet ray absorbing agent include benzophenone based compounds, benzotriazole based compounds, cinnamic acid based compounds, triazine based compounds, stilbene based compounds, and the like. In addition, a generally referred to fluorescent whitening agent, which is a compound that absorbs an ultraviolet ray to emit fluorescence, and which is typified by a benzoxazole based compound may be used.

The viscosity adjusting agent may include a water soluble polymer compound as well as a water soluble organic solvent, and specific examples include polyvinyl alcohols, cellulose derivatives, polyamine, polyimine, and the like.

The dye solubilizer may include, for example, urea, ε-caprolactam, ethylene carbonate, and the like. Of these, it is preferred to use urea.

The discoloration-preventive agent is used for the purpose of improving storability of the image. As the discoloration-preventive agent, a variety of organic and metal complex based discoloration-preventive agents may be used. Examples of the organic discoloration-preventive agent include hydroquinones, alkoxyphenols, dialkoxyphenols, phenols, anilines, amines, indanes, chromanes, alkoxyanilines, heterocycles and the like, whereas examples of the metal complex include nickel complexes, zinc complexes and the like.

As the surface tension adjusting agent, surfactants may be exemplified, and examples include anionic surfactants, amphoteric surfactants, cationic surfactants, nonionic surfactants, and the like.

Examples of the anionic surfactant include alkylsulfocarboxylic acid salts, α-olefinsulfonic acid salts, polyoxyethylenealkyl ether acetic acid salts, N-acylamino acid and salts thereof, N-acylmethyltaurine salts, alkylsulfate polyoxyalkyl ether sulfuric acid salts, alkylsulfate polyoxyethylenealkyl ether phosphoric acid salts, rosin acid soap, castor oil sulfate ester salts, lauryl alcohol sulfate ester salts, alkylphenolic phosphate esters, alkylated phosphate esters, alkylarylsulfonic acid salts, diethyl sulfosuccinic acid salts, diethylhexyl sulfosuccinic acid salts, dioctyl sulfosuccinic acid salts, and the like.

Examples of the cationic surfactant include 2-vinylpyridine derivatives, poly(4-vinylpyridine) derivatives, and the like.

Examples of the amphoteric surfactant include lauryldimethylamino acetate betaine, 2-alkyl-N-carboxymethyl-N-hydroxyethylimidazolinium betaine, coconut oil fatty acid amide propyldimethylamino acetate betaine, polyoctylpolyaminoethylglycine, as well as imidazoline derivatives, and the like.

Examples of the nonionic surfactant include: ether based surfactants such as polyoxyethylene nonylphenyl ether, polyoxyethylene octylphenyl ether, polyoxyethylene dodecyl phenyl ether, polyoxyethylene oleyl ether, polyoxyethylene lauryl ether and polyoxyethylene alkyl ether; ester based surfactants such as polyoxyethylene oleate esters, polyoxyethylene distearate esters, sorbitan laurate, sorbitan monostearate, sorbitan monooleate, sorbitan sesquioleate, polyoxyethylene monooleate and polyoxyethylene stearate; acetylene glycol (alcohol) based surfactants such as 2,4,7,9-tetramethyl-5-decyne-4,7-diol, 3,6-dimethyl-4-octyne-3,6-diol and 3,5-dimethyl-1-hexin-3-ol. Other specific examples include trade names Surfynol 104, 82, 465, Olfin STG manufactured by Nissin Chemical Co., Ltd., and the like.

As the defoaming agent, a highly oxidized oil based compound, glycerin fatty acid ester based compound, fluorine based compound, silicone based compound or the like may be used as needed.

These ink preparation agents may be used either alone or as a mixture. The surface tension of the ink composition for use in the ink set of the present invention is usually 25 to 70 mN/m, and more preferably 25 to 60 mN/m. In addition, the viscosity of the ink composition of the ink set of the present invention is adjusted to preferably no greater than 30 mPa·s, and more preferably no greater than 20 mPa·s.

In production of the ink composition for use in the ink set of the present invention, the order of dissolving each reagent such as additives is not particularly limited. When the composition is prepared, water employed preferably includes impurities in an amount as low as possible, and thus water such as ion exchanged water or distilled water is preferred. Furthermore, precision filtration may be carried out to remove contamination, as needed, using a membrane filter or the like. In particular, when the ink is used as an ink for ink jet printers, carrying out the precision filtration is preferred. The filter for carrying out precision filtration has a pore size of usually 1 to 0.1 μm, and preferably 0.5 to 0.1 μm.

The ink composition for use in the ink set the present invention is suited for use in stamp printing, copying, marking, writing, drawing, stamping, or recording (printing), and particularly in ink jet recording. In addition, the ink composition is less likely to cause precipitation as crystals even though dried in the vicinity of the nozzle of an ink jet printer, and therefore, clogging of the printer head is also less likely to occur based on the same reason. Moreover, when the ink composition is used for ink jet recording, yellow printed matters with a high quality and high color density having favorable resistance to water, light, ozone, friction and the like are obtained.

In some ink jet printers, two kinds of inks, i.e., a high concentration ink and a low concentration ink are loaded for each color in one printer, for the purpose of supplying a high definition image. In this instance, high concentration ink compositions and low concentration ink compositions are prepared respectively, for the yellow ink, the magenta ink, and the cyan ink for use in the ink set of the present invention, and these may be used in combination as an ink set. When inks having two such similar colors are produced as the high concentration ink and the low concentration ink, the low concentration ink is particularly referred to as a photo ink, a light ink or the like. For example, in the case of a magenta ink, the high concentration ink is referred to as a magenta ink, whereas the low concentration ink is referred to as a photo magenta ink, light magenta ink or the like. When similar color inks are separately used as the high concentration ink and the low concentration ink in such a manner, the dye represented by the formula (6), (7), or (1) may be used in only either one of the high concentration ink composition or the low concentration ink composition.

Moreover, in each ink of each color of cyan, magenta or yellow, the dye represented by the formula (6), (7), or (1) may not be used alone as the dye for use in the ink set of the present invention, and other dye may be further added as needed in the range not to change the hue as fundamental three primary colors in subtractive color mixing, and in the range not to impair the effects of the present invention.

Alternatively, an ink having a color other than fundamental three colors in subtractive color mixing such as for example, a black ink, a red ink (may be also referred to as orange ink), a green ink, a blue ink (may be also referred to as a violet ink) or the like may be added, whereby a four or more-color ink set can be provided.

The colored object of the present invention refers to a substance which was colored with the ink set of the present invention. The material entity of the colored object is not particularly limited, and any one is acceptable as long as it can be colored, such as for example, a communication sheet such as a paper or film, a fiber or cloth (cellulose, nylon, wool, etc.), a leather, a substrate for color filters, but not limited thereto. As the coloring method, an ink jet recording method may be employed using an ink jet printer.

The communication sheet is preferably obtained by subjecting a base material to a surface treatment, and specifically obtained by providing an ink receiving layer on a base material such as paper, synthetic paper, films and the like. The ink receiving layer is provided by, for example: a method in which a cation based polymer is impregnated in or coated on the aforementioned base material; a method in which inorganic fine particles that can absorb a coloring matter in an ink such as porous silica, alumina sol or special ceramics are coated on the surface of the aforementioned base material together with a hydrophilic polymer such as polyvinyl alcohol or polyvinylpyrrolidone; or the like.

Such sheets provided with an ink receiving layer are generally referred to as ink jet exclusive paper, ink jet exclusive film, glossy paper, glossy film, and the like.

Among these, the paper referred to as being susceptible to gasses having an oxidizing action in the air, i.e., ozone gas, nitrogen oxide gas etc., is ink jet exclusive paper produced by coating the aforementioned porous silica, alumina sol, special ceramics or the like on the surface of a base material.

Examples of typical commercially available product of the ink jet exclusive paper include e.g., trade names: Professional Photo Paper, Super Photo Paper, and Matte Photo Paper manufactured by Canon, Inc.; trade names: Photo Paper CRISPIA (Super Glossy), Photo Paper (Glossy), and Photo Matte Paper manufactured by Seiko Epson Corporation; trade name: Advanced Photo Paper (Glossy) manufactured by Hewlett-Packard Japan, Ltd.; trade name: KASSAI SHASHIN-SHIAGE Pro manufactured by FUJIFILM Corporation; and the like.

Since the ink set of the present invention is superior in resistance to the gas having an oxidizing action, particularly ozone gas resistance, as described above, superior recorded images accompanied by less discoloration can be provided even when recorded on such a type of record-receiving materials having a porous white inorganic pigment as an ink receiving layer. In addition, the composition can be also used for plain paper.

For recording on a record-receiving material with the ink jet recording method of the present invention, for example, a vessel filled with the ink composition is attached at a specified position of an ink jet printer, and the recording may be executed by a conventional method on the record-receiving material. In the ink jet recording method of the present invention, a cyan ink, a magenta ink and a yellow ink that compose the ink set, as well as if necessary, a green ink, a blue (or violet) ink, a red ink (or orange ink), a black ink and the like may be used in combination. In this case, the ink of each color is injected into each vessel, and the vessels are attached at a specified position of the ink jet printer and then used.

There are ink jet printers in which, for example, a piezo system utilizing mechanical vibration; a bubble jet (registered trademark) system utilizing bubbles generated by heating; or the like is adopted. The ink jet recording method of the present invention can be employed according to any system.

The ink set of the present invention has a high color saturation, and ideal hues as three-primary colors for subtractive color mixing. The ink set of the present invention provides a high contrast ratio and color density of the image recorded particularly on an ink jet exclusive paper or a glossy paper, and has a hue suited for ink jet recording methods. In addition, the ink set is characterized by having superior fastness of the recorded image, in particular, striking moisture resistance, light resistance, and ozone gas resistance.

Each ink composition in the ink set of the present invention is precluded from precipitation and separation during storage, and is thereby capable of providing extremely favorable storage stability. Additionally, when the each ink composition is used in ink jet recording, precipitation of crystals due to drying of the ink composition in the vicinity of the nozzle hardly occurs, and clogging of the injector (ink head) can be also avoided. The each ink composition in the ink set of the present invention does not cause alteration of physical properties even in the case in which: the ink is used by recycling with a comparatively long time interval using a continuous ink jet printer; or the ink is intermittently used with an on-demand ink jet printer; and the like.

EXAMPLES

Hereinafter, the present invention is more specifically described by way of Examples. In the specification, the expressions "part" and "%" are on the basis of the mass unless otherwise specifically stated. In addition, the steps of the reaction, crystallization and the like were carried out under stirring unless otherwise specifically stated.

Dye Synthesis Example 1

Step 1

Synthesis of Copper Tribenzo(2,3-pyrido)porphyrazine (Mixture of the Compounds Represented by the Above Formula (30) in which: 1.0 Ring Among A, B, C and D Represents a Pyridine Ring; and the Remaining 3.0 Rings Represent a Benzene Ring)

Into a four-necked flask were charged 250 parts of sulfolane, 12.3 parts of phthalimide, 15.0 parts of quinolinic acid, 72.0 parts of urea, 8.8 parts of copper chloride (II) dihydrate (purity: 97.0%), 1.0 parts of ammonium molybdate. The temperature of the mixture was elevated to 200° C., and maintained at the same temperature for 5 hrs. After completing the reaction, the mixture was cooled to 65° C., to which 200 parts of methanol was placed, and the crystals were filtered off. Thus obtained crystals were washed with 150 parts of methanol, and subsequently with 200 parts of warm water, followed by drying to obtain 72.2 parts of a wet cake. The entirety of thus obtained wet cake was placed into 500 parts of 5% hydrochloric acid, and the temperature was elevated to 60° C., followed by maintaining at the same temperature for 1 hour. The crystals were filtered off, and washed with 200 parts of water. Next, the entirety of thus obtained wet cake was placed into 500 parts of 10% aqueous ammonia, and maintained at 60° C. for 1 hour. After the crystals were filtered off, washing with 300 parts of water and 100 parts of methanol gave 33.6 parts of a wet cake. Thus obtained wet cake was dried at 80° C. to obtain 20 parts of a mixture of copper tribenzo(2,3-pyrido)porphyrazine and copper dibenzobis(2, 3-pyrido)porphyrazine as blue crystals. The product exhibited λmax in pyridine of 655.0 nm.

Step 2

Synthesis of Copper Tribenzo(2,3-pyrido)porphyrazinetrisulfonyl Chloride (Mixture of the Compounds Represented by the Above Formula (8) in which: 1.0 Ring Among A, B, C and D Represents a Pyridine Ring; the Remaining 3.0 Rings Represents a Benzene Ring; and q Represents 3.0)

Into 46.2 parts of chlorosulfonic acid was gradually charged 5.8 parts of a mixture of the copper tribenzo(2,3-pyrido)porphyrazine obtained in the above Dye Synthesis Example 1 (step 1) and copper dibenzobis(2,3-pyrido)porphyrazine while stirring at no higher than 60° C., and the reaction was allowed at 140° C. for 4 hrs. Next, the reaction liquid was cooled to 70° C., to which 17.9 parts of thionyl chloride was added dropwise over 30 min to allow for the reaction at 70° C. for 3 hrs. The reaction liquid was cooled to no higher than 30° C., and was slowly poured to 800 parts of ice water. Thus precipitated crystals were filtered off, and washed with 200 parts of cold water to obtain 40.1 parts of a wet cake of copper tribenzo(2,3-pyrido)porphyrazinetrisulfonyl chloride.

Step 3

Synthesis of Compound Represented by the Following Formula (44) (Compound Represented by the Above Formula (9) in which X Represents 4-sulfoanilino; Y Represents 2-sulfoethylamino; and E Represents Ethylene)

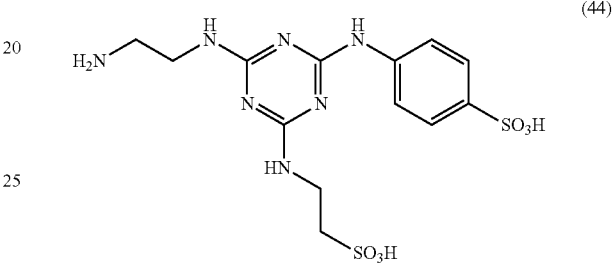

(44)

Into 330 parts of ice water were added 18.4 parts of cyanuric chloride and 0.2 parts of Leocol TD-90 (trade name, surfactant, manufactured by Lion Corporation), and the mixture was stirred at no higher than 10° C. for 30 min. Next, thereto was added 17.4 parts of 4-sulfoaniline (purity: 99.3%), and the reaction was allowed while adjusting the pH to 2.6 to 3.0 with a 10% aqueous sodium hydroxide solution at 0 to 5° C. for 1 hour, and the pH to 3.0 to 3.5 at 0 to 5° C. for 1 hour, followed by at 25 to 30° C. for 1 hour. Subsequently, 12.6 parts of 2-sulfoethylamine was added to the reaction liquid, and the reaction was allowed while adjusting the pH to 7.0 to 8.0 with a 10% aqueous sodium hydroxide solution at 25° C. for 2 hrs. Then, thereto was added 250 parts of ice to cool the mixture to 0° C., and then 60 parts of ethylene diamine was added dropwise while keeping the temperature at no higher than 5° C. Thereafter, following stirring at room temperature overnight, the pH was adjusted to 1.0 with conc. hydrochloric acid. During this step, the temperature was kept at 10 to 15° C. by adding ice. The amount of the liquid was 980 parts in this step. To this reaction liquid was added 190 parts of sodium chloride, and the mixture was stirred for 30 min to allow the crystals to be precipitated. Thus precipitated crystals were filtered off to obtain 70.6 parts of a wet cake. Thus obtained wet cake was placed into a beaker, to which 280 parts of water was added, and a 10% aqueous sodium hydroxide solution was used to adjust the pH to 9.0 and to permit dissolution. The amount of the liquid was 400 parts in this step. The pH of this reaction liquid was adjusted to 1.0 with conc. hydrochloric acid, and 80 parts of sodium chloride was added to this liquid, followed by stirring for 30 min to allow the crystals to be precipitated. Thus precipitated crystals were filtered off to obtain 110.1 parts of a wet cake. Thus obtained wet cake was placed into a beaker, to which 260 parts of methanol and 26 parts of water were added. After stirring the mixture at 50° C. for 1 hour, filtration gave 89.1 parts of a wet cake. Thus obtained wet cake was dried to obtain 49.3 parts of white powder.

Step 4

Synthesis of the Compound Represented by the Following Formula (45) (Compound Represented by the Above Formula (7) in which: 1.0 Ring among A, B, C and D Represents a Pyridine Ring; the Remaining 3.0 Rings Represent a Benzene Ring; E Represents Ethylene; X Represents 4-Sulfoanilino; Y Represents 2-sulfoethylamino; and b Represents 2.36 and c Represents 0.64)

(45)

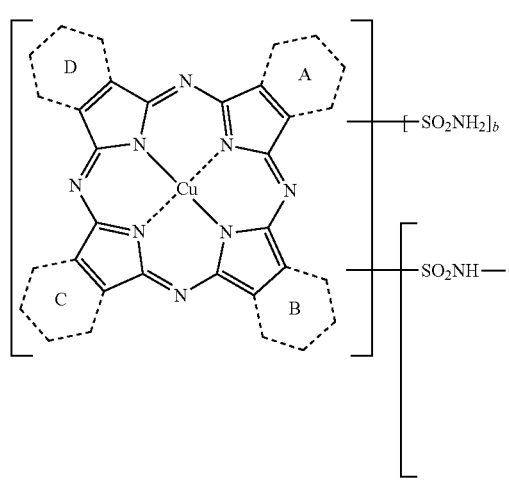

Into 50 parts of ice water was added 40.1 parts of the wet cake of copper tribenzo(2,3-pyrido)porphyrazinetrisulfonyl chloride obtained in the above Dye Synthesis Example 1 (step 2), and allowing to be suspended by stirring at no higher than 5° C. After 10 min, a solution prepared by dissolving 3.0 parts of the compound represented by the above formula (44) in 2 parts of 28% aqueous ammonia and 60 parts of water was poured thereto while maintaining at no higher than 10° C., with the pH kept at 9.0 by adding 28% aqueous ammonia. The temperature was elevated to 20° C. while maintaining at the same pH over 1 hour, and maintained at the same temperature for 8 hrs. The amount of the liquid in this step was 620 parts. The temperature of the reaction liquid was elevated to 50° C., and 93 parts of sodium chloride (15% with respect to the reaction liquid) was added thereto. After the mixture was stirred for 30 min, the pH was adjusted to 2.0 over 20 min followed by filtration, and washing with 100 parts of a 10% aqueous sodium chloride solution to obtain 42.1 parts of a wet cake. Thus obtained wet cake was dissolved with 360 parts of water, and a 25% aqueous sodium hydroxide solution was used to adjust the pH to 9.0 and to permit dissolution. The amount of the liquid was 400 parts in this step. The temperature of the dissolved liquid was elevated to 50° C., and 60 parts of sodium chloride (15% with respect to the dissolved liquid)) was added thereto. After the mixture was stirred for 30 min, the pH was adjusted to 1.0 over 20 min, followed by filtration and washing with a 10% aqueous sodium chloride solution 100 parts to obtain 41.2 parts of a wet cake of the sodium salt of a compound represented by the formula (45) as its free acid. To thus obtained wet cake were added 255 parts of methanol and 45 parts of water. After stirring the mixture at 50° C. for 1 hour, filtration gave 21.2 parts of a wet cake. The wet cake was dried to obtain 10.1 parts of a cyan dye as blue powder. An average molecular weight of 1082.8 was determined from the contents of copper and the inorganic matter of thus obtained powder. This dye exhibited λmax of 602.7 nm in an aqueous solution.

Dye Synthesis Example 2

Step 1

Into 360 parts of xylene were sequentially added 94.8 parts of a compound represented by the following formula (38), 3.0 parts of sodium carbonate, 144.0 parts of benzoylethyl acetate ester, and the temperature was elevated to carry out the reaction at a temperature of 140 to 150° C. for 8 hrs. During this step, ethanol and water generated by the reaction were distilled off outside the system while by azeotropy with xylene to complete the reaction. Next, the reaction mixture was cooled, and thereto was added 240 parts of methanol at 30° C. After the mixture was stirred for 30 min, precipitated solid was filtered off. After thus obtained solid was washed with 360 parts of methanol, drying gave 124.8 parts of a compound represented by the following formula (39) as pale yellow needle crystals.

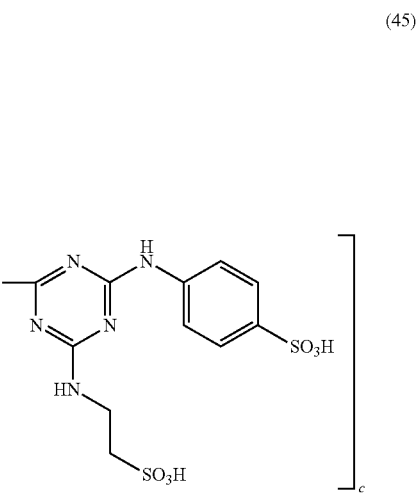

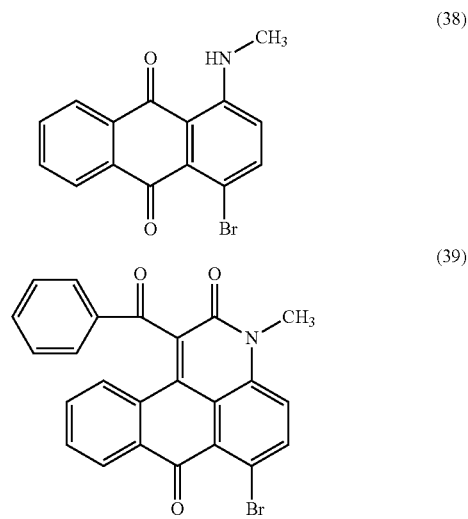

Step 2

Into 300.0 parts of N,N-dimethylformamide were sequentially added 88.8 parts of the compound represented by the above formula (39), 75.0 parts of meta-aminoacetanilide, 24.0 parts of copper acetate monohydrate and 12.8 parts of sodium carbonate, and the temperature of the mixture was elevated to 120 to 130° C. to carry out the reaction for 3 hrs. The reaction liquid was cooled to about 50° C., and 120 parts of methanol was added thereto, followed by stirring for 30 min. Thus precipitated solid was filtered off, and washed with 500 parts of methanol, followed by washing with hot water at 80° C. and drying to obtain 79.2 parts of a compound represented by the following formula (40) as bluish red crystals.

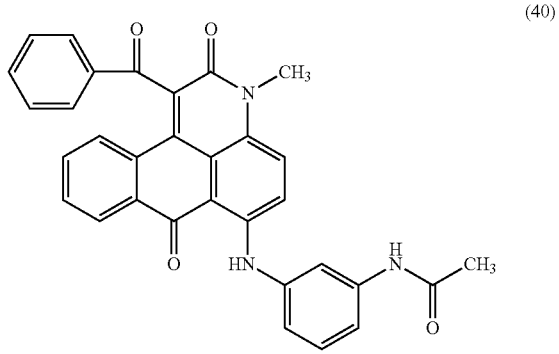

(40)

Step 3

To 130 parts of 98% sulfuric acid was added 170 parts of 28% fuming sulfuric acid while cooling with water to prepare 300 parts of 12% fuming sulfuric acid. After 51.3 parts of the compound represented by the above formula (40) is added at no higher than 50° C. under cooling with water, the temperature was elevated to 85 to 90° C. to carry out the reaction for 4 hrs. The reaction liquid was added into 600 parts of ice water, and the liquid temperature was maintained at no higher than 40° C. by preventing temperature elevation due to heat generation while adding ice during the reaction. After water was further added to give 1,000 parts of the amount of the liquid, undissolved matters were removed by filtration. Hot water was added to thus obtained mother liquid to give the amount of 1,500 parts, and 300 parts of sodium chloride was added while keeping the liquid temperature of 60 to 65° C., followed by stirring for 2 hrs. Thus precipitated crystals were filtered off. The crystals were washed with 300 parts of a 20% aqueous sodium chloride solution, and the moisture was well drawn off by squeezing to obtain 100.3 parts a wet cake containing 59.2 parts of a compound represented by the following formula (41) as red crystals.

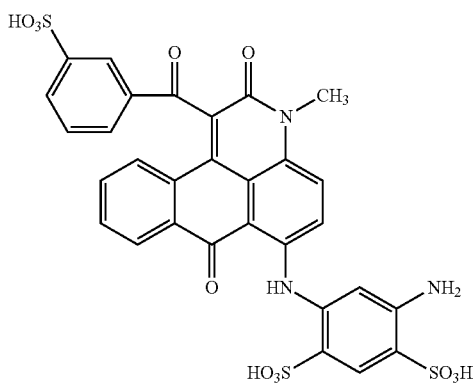

(41)

Step 4

Into 1,000 parts of water were added 1,300 parts of the wet cake represented by the formula (41) obtained in the above Dye Synthesis Example 2 (Step 3) and 500 parts of 25% sodium hydroxide, to allow for complete dissolution. This compound had a purity of 24.35% according to a diazo analytical technique. To 20 parts of water was added 64 parts of this solution, and the liquid temperature was lowered to no higher than 10° C. by cooling with ice. Thereto was added 5.8 parts of chloroacetyl chloride, and the mixture was stirred at 10° C. for 30 min while maintaining the pH at 2.5. The pH was adjusted with a 25% aqueous sodium hydroxide solution. The temperature of this reaction liquid was elevated to 50 to 60° C., and 20 parts of sodium chloride was added thereto. The mixture was stirred, and the precipitated crystals were filtered off. The crystals were washed with 100 parts of a 22% aqueous sodium chloride solution, and the moisture was well drawn off by squeezing to obtain a 34 parts of a wet cake of the sodium salt of a compound represented by the following formula (42).

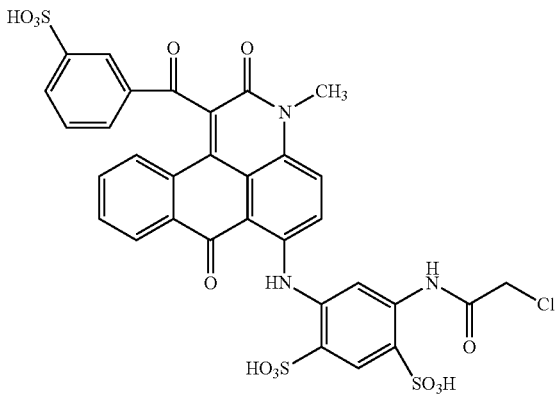

(42)

Step 5

The wet cake containing 17 parts of the compound represented by the formula (42) obtained in the above Dye Synthesis Example 2 (step 4) was dissolved by adding water to give 89 parts in total. The temperature was elevated to 60° C., and 13 parts of 6-aminohexanoic acid was added at pH 10, followed by stirring for 30 min. The pH was adjusted with a 25% aqueous sodium hydroxide solution. The pH was adjusted to 0.5 with 35% hydrochloric acid at a liquid temperature of 50 to 55° C., and 30 parts of ammonium chloride was added to the liquid. The mixture was stirred, and the precipitated solid was filtered off. The solid was washed with 100 parts of a 23% aqueous ammonium chloride solution, and the obtained wet cake was added into 100 parts of methanol liquid, followed by stirring while heating. After thus obtained solid was filtered off, washing with methanol and drying gave 16 parts of the ammonium salt of a magenta dye represented by the following formula (43) as a red solid. This dye exhibited λmax (maximum absorption wavelength) of 531 nm in an aqueous solution.

(43)

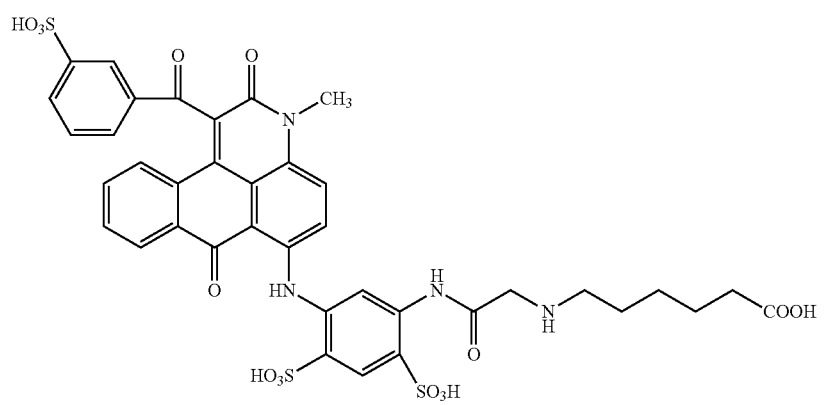

Dye Synthesis Example 3

Step 1

2-Aminonaphthalene-4,8-disulfonic acid in an amount of 30.3 parts was dissolved in 200 parts of water while adjusting the pH to 6 with sodium hydroxide, and then 7.2 parts of sodium nitrite was added thereto. After this solution was added dropwise to 300 parts of 5% hydrochloric acid at 0 to 10° C. over 30 min, the mixture was stirred at no higher than 10° C. for 1 hour to carry out a diazotization reaction, whereby a diazo reaction liquid was prepared.

On the other hand, 9.3 parts of aniline was converted into a methyl-ω-sulfonate derivative using 130 parts of water, 10.4 parts of sodium bisulfite, and 8.6 parts of 35% formalin by a routine method.

Thus obtained methyl-ω-sulfonate derivative was added to the diazo reaction liquid prepared beforehand, and the mixture was stirred at 0 to 15° C. and a pH of 2 to 4 for 5 hrs. After the pH of the reaction liquid was adjusted to 11 with sodium hydroxide, the liquid was stirred while maintaining the same pH at 80 to 95° C. for 5 hrs, and further 100 parts of sodium chloride was added thereto to allow for salting-out. The precipitated solid was collected by filtration to obtain 100 parts of a compound represented by the following formula (36) as wet cake.

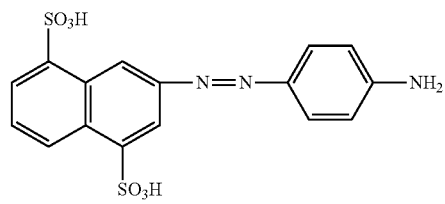
(36)

Step 2

Into 250 parts of ice water was added 0.10 parts of Leocol TD90 (trade name, surfactant) manufactured by Lion Corporation, and the mixture was vigorously stirred, to which 12.9 parts of cyanuric chloride was added, followed by stirring at 0 to 5° C. for 30 min to obtain a suspension.

Subsequently, 25.0 parts of the compound represented by the formula (17) was dissolved in 200 parts of water, and the aforementioned suspension was added dropwise to this solution over 30 min. After completing the dropwise addition, the mixture was stirred at a pH of 5 to 7, at 0 to 15° C. for 6 hrs to obtain a reaction liquid.

Step 3

The wet cake of the compound represented by the above formula (36) obtained in the above Dye Synthesis Example 3 (step 1) in an amount of 100 parts was dissolved in 300 parts of water, and the solution was added dropwise to the reaction liquid obtained in the above Dye Synthesis Example 3 (step 2) over 30 min. After completing the dropwise addition, the mixture was stirred at a pH of 6 to 7, at 25 to 50° C. for 6 hrs to which 26.3 parts of taurine was added followed by stirring at a pH of 7 to 9, at 75 to 90° C. for 3 hrs. After cooling the obtained reaction liquid to 20 to 25° C., 800 parts of acetone was added to this reaction liquid, followed by stirring at 20 to 25° C. for 1 hour. The precipitated solid was collected by filtration to obtain 120.0 parts of wet cake. This wet cake was dried with a hot-air dryer at 80° C. to obtain 50.0 parts of a yellow dye represented by the following formula (37) as a sodium salt. This dye exhibited λmax (maximum absorption wavelength) of 382 nm in an aqueous solution.

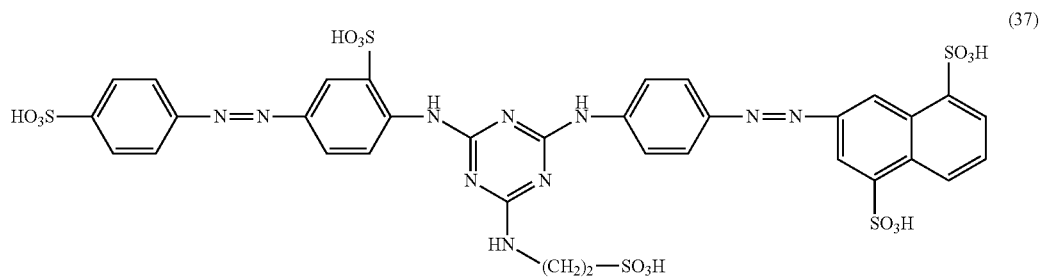
(37)

(A) Preparation of Ink Composition, and Production of Ink Set

Ink compositions were prepared by mixing each component at ordinary temperature based on the compositions shown in Table 4 below, and each aqueous ink composition for ink-jet recording was obtained by filtration with a 0.45 μm membrane filter. The values shown in Table 4 are on the basis of part by mass. It should be noted that the water used, including water for use in dilution, as shown in Table 4 was ion exchanged water. Moreover, water and a 2.5% aqueous sodium hydroxide solution, or water and a 2.8% aqueous ammonia ink composition were added so as to adjust the pH to be 8 to 10, and to give the total amount of 100 parts.

An ink composition prepared using the cyan dye represented by the formula (45) obtained in the Dye Synthesis Example 1 (step 4) is defined as C-03. An ink composition prepared using the magenta dye represented by the formula (43) obtained in the Dye Synthesis Example 2 (step 5) is defined as M-02. An ink composition prepared using the yellow dye represented by the formula (37) obtained in the Dye Synthesis Example 3 (step 3) is defined as Y-01. An ink composition prepared using the magenta dye represented by the formula (41) obtained in the Dye Synthesis Example 2 (step 3) is defined as M-12. These ink compositions were combined as shown in Table 5 below to produce an ink set of Example 1 of the present invention. Thus, ink-jet recording was carried out, and evaluation of the recorded image was made. The results are shown in Tables 6 and 7 below.

TABLE 4

|  | Y-01 | M-02 | C-03 | M-12 |
|---|---|---|---|---|
| formula (37) | 3.5 |  |  |  |
| formula (43) |  | 6.0 |  |  |
| formula (45) |  |  | 5.0 |  |
| formula (41) |  |  |  | 6.0 |
| glycerin | 5.0 | 5.0 | 5.0 | 5.0 |
| urea | 5.0 | 5.0 | 5.0 | 5.0 |
| N-methyl-2-pyrrolidone | 4.0 | 4.0 | 4.0 | 4.0 |
| isopropyl alcohol | 3.0 | 3.0 | 3.0 | 3.0 |
| butylcarbitol | 2.0 | 2.0 | 2.0 | 2.0 |
| Surfinol 104PG50 | 0.1 | 0.1 | 0.1 | 0.1 |
| 2.5% NaOH + water | 77.4 |  | 75.9 |  |
| 2.8% aqueous ammonia + water |  | 74.9 |  | 74.9 |

TABLE 5

|  | yellow | magenta | cyan |
|---|---|---|---|
| Example 1 | Y-01 | M-02 | C-03 |
| Comparative Example 1 | Y-01 | M-12 | C-03 |

(B) Ink Jet Printing

Ink-jet recording was carried out using an ink jet printer (manufactured by Canon, Inc., Pixus iP3100) on two kinds of glossy papers having an ink image receiving layer containing a porous white inorganic substance. Upon the ink-jet recording, an image pattern was provided such that the tone with several levels of print density can be yielded, and a printed matter was produced for use as a test piece. The employed glossy papers were as follows.

Glossy paper 1: manufactured by Canon, Inc., trade name Professional Photo Paper PR-101
Glossy paper 2: manufactured by Epson, trade name CRISPIA
Glossy paper 3: manufactured by HP Co., trade name Advanced Photo Paper (C) Ozone Gas Resistance Test on Recorded Image The test piece produced as described in the above section of "(B) Ink Jet Printing" was left to stand in an environment involving an ozone concentration of 10 ppm, a humidity of 60% RH, at a temperature of 24° C. for 8 hrs using an ozone weather meter (manufactured by Suga Test Instruments Co., Ltd.). The recording paper was subjected to colorimetry using a colorimetric system (GRETAG SPM50: manufactured by GRETAG Corp.) to make an evaluation by determining the color difference (ΔE) of the recording paper before and after the test having a D value of 1.0 to 1.2.

The results are shown in Table 6 below. It should be noted that each value in Table 6 is based on the aforementioned ΔE. When this value is smaller, more favorable results are suggested.

(D) Moisture Resistance Test of Recorded Image

Test pieces produced by printing on the glossy papers 1 to 3 were left to stand at 30° C. and 80% RH for 168 hrs using a Constant Temperature and Humidity Chamber (manufactured by OHYO Co., LTD.). The bleeding features before and after the test at a D value of around 1.7 were decided visually to evaluate on a three-point scale.

A: no bleeding found
B: slight bleeding found
C: significant bleeding found

The results are shown in Table 7 below.

TABLE 6

|  | single color ||| mixed color ||||
|---|---|---|---|---|---|---|---|
|  | yellow | magenta | cyan | orange | green | blue | black |
| Glossy paper 1 ||||||||
| Example 1 | 2.3 | 7.9 | 4.0 | 4.5 | 3.6 | 9.6 | 5.9 |
| Comparative Example 1 |  | 78.8 |  | 66.7 | 3.4 | 55.9 | 58.1 |
| Glossy paper 2 ||||||||
| Example 1 | 1.5 | 5.5 | 2.5 | 2.0 | 4.7 | 4.5 | 3.8 |
| Comparative Example 1 |  | 80.1 |  | 59.8 | 4.6 | 51.9 | 50.5 |
| Glossy paper 3 ||||||||
| Example 1 | 1.9 | 4.0 | 3.1 | 1.5 | 4.9 | 4.6 | 4.3 |
| Comparative Example 1 |  | 74.5 |  | 56.5 | 4.5 | 48.7 | 44.5 |

As shown in Table 6, the color difference (ΔE) of the mixed color of the ink set of the present invention in the ozone resistance test was comparative to that of the single colors of the yellow, magenta and cyan ink composition on all the glossy papers, suggesting extremely favorable ozone resistance. In addition, when the magenta dye of the present invention is changed to the dye of Comparative Example 1, the color difference of colors (orange, blue and black) with which magenta is mixed of the ink set became significantly great, whereby it is also proven that extremely favorable ozone gas resistance of the ink set including the magenta dye of the present invention can be provided.

TABLE 7

|  | ink set ||||
|---|---|---|---|---|
|  | orange | green | blue | black |
| Glossy paper 1 |||||
| Example 1 | A | A | A | A |
| Comparative Example 1 | A | A | A | B, A |

TABLE 7-continued

|  | ink set | | | |
| --- | --- | --- | --- | --- |
|  | orange | green | blue | black |
| Glossy paper 2 | | | | |
| Example 1 | A | A | A | A |
| Comparative Example 1 | C | A | A | C |
| Glossy paper 3 | | | | |
| Example 1 | A | A | A | A |
| Comparative Example 1 | A | A | A | B |

From the results shown in Table 7, it is revealed that the mixed color of the ink set of the present invention resulted in no bleeding as compared with the mixed color of the ink set of Comparative Example 1 in any of the case in which any of the glossy paper was used, demonstrating extremely favorable moisture resistance.

From the results described above, it is clear that the ink set of the present invention composed of ink compositions of at least two colors of magenta and cyan, preferably three colors including a yellow ink composition is an ink set capable of providing an image having superior ozone resistance and moisture resistance, and can be concluded that it is extremely superior as an ink set for use in ink jet recording methods in which a color image is presented by a subtractive color mixing process.

INDUSTRIAL APPLICABILITY

The image recorded by the ink set of the present invention has superior fastness properties, particularly ozone resistance and moisture resistance, and thus the ink set of the present invention can be suitably used for applications of ink jet inks as an ink set for use in an ink jet recording method that presents a full color image by a subtractive color mixing process.

The invention claimed is:

1. An ink set for ink-jet recording which is an at least two-color ink set comprising at least a cyan ink composition and a magenta ink composition, wherein a cyan dye contained in the cyan ink composition is a dye represented by the following formula (7) or a salt thereof, and a magenta dye contained in the magenta ink composition is a dye represented by the following formula (6) or a salt thereof,

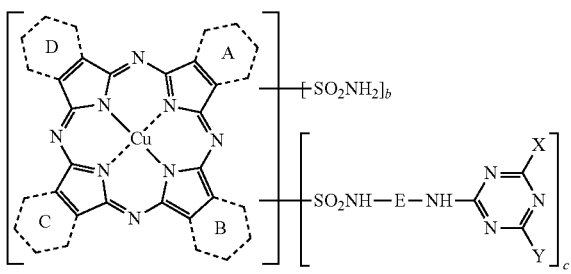

(7)

wherein, rings A to D each independently represent a benzene ring or a six-membered nitrogen-containing heteroaromatic ring; and at least one represents a nitrogen-containing heteroaromatic ring, and at least one of the rest represents a benzene ring;

E represents an alkylene group;

X represents an anilino group or a naphthylamino group having at least one sulfo group, carboxy group, or phosphoric acid group as a substituent, and the anilino group or naphthylamino group may be further substituted with one, or at least two substituents selected from the group consisting of a sulfo group, a carboxy group, a phosphoric acid group, a sulfamoyl group, a carbamoyl group, a hydroxy group, an alkoxy group, an amino group, a mono- or dialkylamino group, a mono- or diarylamino group, an acetylamino group, an ureide group, an alkyl group, a nitro group, a cyano group, a halogen atom, an alkylsulfonyl group and an alkylthio group;

Y represents an amino group; a hydroxy group; or a mono- or dialkylamino group or nitrogen-containing heterocycle group which may have one, or at least two substituents selected from the group consisting of a sulfo group, a carboxy group, a phosphoric acid group, a sulfamoyl group, a carbamoyl group, a hydroxy group, an alkoxy group, a hydroxyalkoxy group, an amino group, a mono- or dialkylamino group, a mono- or diarylamino group, an acetylamino group, an ureide group, an alkyl group, a nitro group, a cyano group, a halogen atom, an alkylsulfonyl group and an alkylthio group; with the proviso that combinations in which Y represents an amino group or a hydroxy group, and X represents a substituted anilino group are excluded;

b is a number from 0 to 2.9; c is a number from 0.1 to 3; and the sum of b and c is 1 to 3.

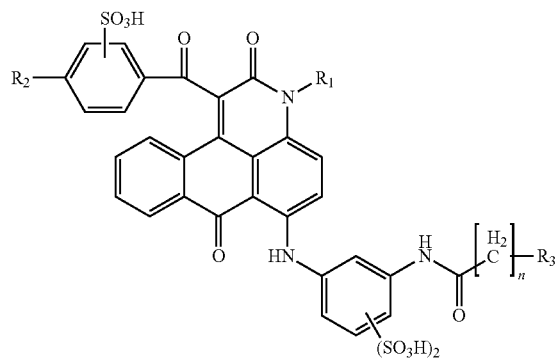

(6)

wherein, n represents an integer of 1 to 3;

$R_1$ represents a hydrogen atom, an alkyl group, a hydroxy lower alkyl group, a cyclohexyl group, a mono- or dialkylaminoalkyl group, or a cyano lower alkyl group;

$R_2$ represents a hydrogen atom or a methoxy group;

$R_3$ represents an anilino group substituted with a group selected from the group consisting of a sulfo group, a carboxy group, an alkoxy group, a carbamoyl group, a cyano group, an alkyl group, an anilino group, a phenoxy group, an amino group, a hydroxy group and a mercapto group, or an unsubstituted anilino group; a mono- or dialkylamino group substituted with a group selected from the group consisting of a sulfo group, a carboxy group, an alkoxy group, a carbonyl group, a carbamoyl group, a cyano group, an anilino group, a phenoxy group, an amino group, a hydroxy group, a mercapto group and a phenyl group, or an unsubstituted mono- or dialkylamino group; a phenylthio group substituted with a group selected from the group consisting of a sulfo group, a carboxy group, an alkoxy group, a carbonyl group, a carbamoyl group, a cyano group, an alkyl group, an anilino group, a phenoxy group, an amino group, a hydroxy group and a mercapto group, or an unsubstituted phenylthio group; an alkylthio group substituted with a group selected from the group consisting of a sulfo group, a carboxy group, an alkoxy group, a carbonyl group, a carbamoyl group, a cyano group, an anilino group, a phenoxy group, an amino group, a hydroxy group, a mercapto group and a phenyl group, or an unsubstituted alkylthio group; a sulfoanilino group substituted with a methyl group, a methoxy group or a carboxy group; a carboxy-substituted hydroxyanilino group; a sulfo group-substituted naphthylamino group, or an unsubstituted naphthylamino group; a phenoxy group substituted with a group selected from the group consisting of a sulfo group, a carboxy group, an acetylamino group, an amino group, a hydroxy group, a phenoxy group and a phenyl group, or an unsubstituted phenoxy group; a monoalkylaminoalkylamino group; a dialkylaminoalkylamino group; a hydroxy group; a mercapto group; or an amino group; provided that all the aforementioned groups and substituents represented by $R_1$ to $R_3$ have a hydrogen atom, the hydrogen atom may be substituted with a group other than a hydrogen atom.

2. The ink set for ink-jet recording according to claim 1, wherein the cyan dye represented by the above formula (7) contained in the cyan ink composition is a dye obtained by allowing a compound represented by the following formula (8) to react with an organic amine represented by the following formula (9) in the presence of ammonia or a source of ammonia generation, or a salt thereof:

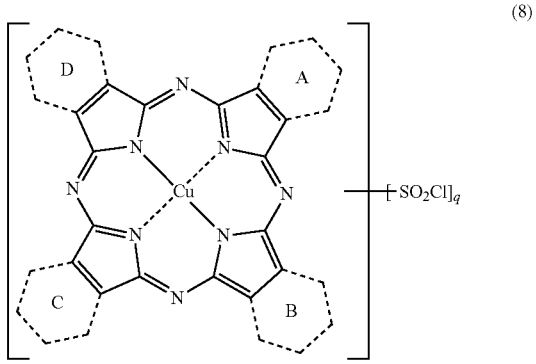

(8)

wherein, rings A to D are defined similarly to those in the formula (7), and q is a number of from 1 to 3;

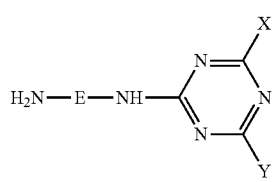

(9)

wherein, E, X, and Y are defined similarly to those in the formula (7).

3. The ink set for ink-jet recording according to claim 2, wherein the compound represented by the above formula (8) is a compound represented by the following formula (12):

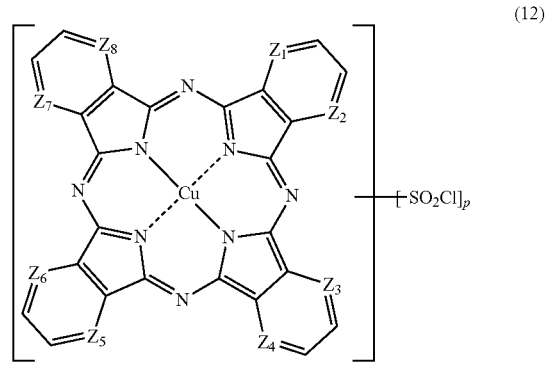

(12)

wherein, $Z_1$ to $Z_8$ each independently represent a nitrogen atom or CH, and among four combinations of $Z_1$ and $Z_2$, $Z_3$ and $Z_4$, $Z_5$ and $Z_6$, and $Z_7$ and $Z_8$, at least one is a combination of CH and CH, any one is not a combination of nitrogen atoms, and not all the four combinations are CH and CH, and p is a number from 1 to 3.

4. The ink set for ink-jet recording according to claim 1, wherein the magenta dye represented by the above formula (6) or a salt thereof is a dye represented by the following formula (10) or a salt thereof:

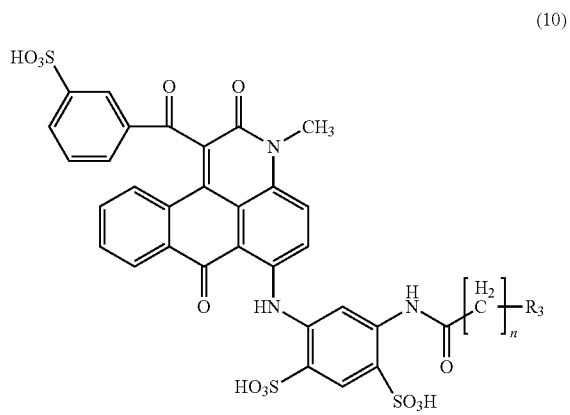

(10)

wherein, n and $R_3$ are defined similarly to those in the formula (6).

5. The ink set for ink-jet recording according to claim 1, wherein the cyan dye represented by the above formula (7) or a salt thereof contained in the cyan ink composition is a dye represented by the following formula (11) or a salt thereof:

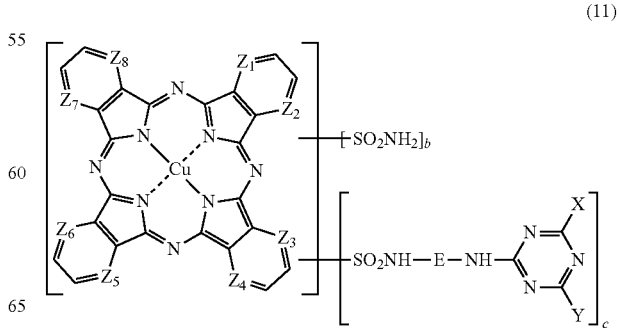

(11)

wherein, $Z_1$ to $Z_8$ each independently represent a nitrogen atom or CH, and among four combinations of $Z_1$ and $Z_2$, $Z_3$ and $Z_4$, $Z_5$ and $Z_6$, and $Z_7$ and $Z_8$, at least one is a combination of CH and CH, any one is not a combination of nitrogen atoms, and not all four combinations are CH and CH;

and E, X, Y, b, and c are defined similarly to those in the formula (7).

6. The ink set for ink-jet recording according to claim 1, wherein the total content of the cyan dye in the total mass of the cyan ink composition is 2.0 to 6.0% by mass.

7. The ink set for ink-jet recording according to claim 1, wherein the total content of the magenta dye in the total mass of the magenta ink composition is 1.0 to 8.0% by mass.

8. The ink set for ink-jet recording according claim 1, which is a three-color ink set comprising three kinds of ink compositions composed of a yellow ink composition in addition to the two kinds of ink compositions including the cyan ink composition and the magenta ink composition.

9. The ink set for ink-jet recording according to claim 8, wherein the total content of a yellow dye in the total mass of the yellow ink composition is 1.0 to 5.0% by mass.

10. An ink jet recording method comprising discharging ink droplets of each ink of the ink set according to claim 1 in response to recording signals to execute recording by allowing the ink to adhere on a record-receiving material.

11. The ink jet recording method according to claim 10, wherein the record-receiving material is a communication sheet.

12. The ink jet recording method according to claim 11, wherein the communication sheet is a plain paper or a sheet having an ink image receiving layer containing a porous white inorganic substance.

13. A colored object which was colored with the ink set according to claim 1.

14. The colored object according to claim 13, wherein the coloring is carried out with an ink jet printer.

15. An ink jet printer equipped with vessels each containing the ink composition of the ink set according to claim 1.

* * * * *